(12) United States Patent
Hennemann et al.

(10) Patent No.: US 10,914,414 B2
(45) Date of Patent: Feb. 9, 2021

(54) PIPE COUPLING

(71) Applicant: Aqseptence Group, Inc., New Brighton, MN (US)

(72) Inventors: Thomas L. Hennemann, Cottage Grove, MN (US); Thomas J. Berger, St. Louis Park, MN (US)

(73) Assignee: Aqseptence Group, Inc., New Brighton, MN (US)

( * ) Notice: Subject to any disclaimer, the term of this patent is extended or adjusted under 35 U.S.C. 154(b) by 0 days.

(21) Appl. No.: 16/293,210

(22) Filed: Mar. 5, 2019

(65) Prior Publication Data

US 2020/0032938 A1    Jan. 30, 2020

Related U.S. Application Data

(63) Continuation of application No. 14/212,847, filed on Mar. 14, 2014, now Pat. No. 10,221,977, which is a
(Continued)

(51) Int. Cl.
| | | |
|---|---|---|
| *F16L 37/091* | (2006.01) | |
| *F16L 37/088* | (2006.01) | |
| *F16L 25/00* | (2006.01) | |

(52) U.S. Cl.
CPC ........... *F16L 37/091* (2013.01); *F16L 25/009* (2013.01); *F16L 37/088* (2013.01); *F16L 2201/10* (2013.01); *F16L 2201/60* (2013.01)

(58) Field of Classification Search
CPC ..... F16L 37/091; F16L 25/009; F16L 37/088; F16L 2201/10; F16L 2201/60
See application file for complete search history.

(56) References Cited

U.S. PATENT DOCUMENTS

| 1,587,079 A | 6/1926 | Machino |
| 2,111,956 A | 3/1938 | Baldwin |
| (Continued) | | |

FOREIGN PATENT DOCUMENTS

| CH | 688 659 A5 | 12/1997 |
| DE | 24 40 886 A1 | 3/1976 |
| (Continued) | | |

OTHER PUBLICATIONS

Transcript of May 12, 2004 deposition of Certainteed Corporation witness Joh Stott, pp. 120 and 209-214, Civil Action No. 03-CV-2131 in the United States District Court, Eastern District of Pennsylvania.
(Continued)

*Primary Examiner* — Lee A Holly
(74) *Attorney, Agent, or Firm* — Patterson Thuente Pedersen, P.A.

(57) ABSTRACT

A pipe coupling for connecting adjacent pipes. The pipe coupling has a connection type at each end that may be male or female. A female end may have an interior surface defining a receiving chamber. An interior circumferential groove is formed in the interior surface in which a band is seated. A plurality of rigid fingers is extends from the band into the receiving chamber. The receiving chamber receives a male end of an adjacent pipe, the male end having an exterior surface. An exterior circumferential groove is defined on the exterior surface to receive the plurality of rigid fingers. A variety of connection types and combinations are disclosed. The female end may define a sight window to permit viewing of the position of a male end of an adjacent pipe. The receiving chamber may have a reduced diameter proximate to the middle of the coupling to improve sealing.

6 Claims, 17 Drawing Sheets

Related U.S. Application Data continuation-in-part of application No. 12/494,073, filed on Jun. 29, 2009, now Pat. No. 9,810,358, which is a continuation-in-part of application No. 12/365,000, filed on Feb. 3, 2009, now Pat. No. 8,342,579.

(60) Provisional application No. 61/802,142, filed on Mar. 15, 2013.

(56) References Cited

U.S. PATENT DOCUMENTS

| | | |
|---|---|---|
| 2,479,960 A | 8/1949 | Osborn |
| 2,785,910 A * | 3/1957 | Munger .............. B29C 66/5221 285/22 |
| 3,272,538 A | 9/1966 | Bergstrom |
| 3,389,923 A | 6/1968 | Billings et al. |
| 3,413,021 A | 11/1968 | Potts |
| 3,532,367 A | 10/1970 | Roos |
| 3,534,776 A | 10/1970 | Gilreath |
| 3,744,824 A | 7/1973 | Roos |
| 3,784,235 A | 1/1974 | Kessler et al. |
| 3,995,897 A | 12/1976 | Paskert |
| 4,030,850 A | 6/1977 | Hyde |
| 4,072,328 A | 2/1978 | Elliott |
| 4,105,226 A | 8/1978 | Frey et al. |
| 4,128,264 A | 12/1978 | Oldford |
| 4,146,254 A | 3/1979 | Turner |
| 4,191,384 A | 3/1980 | Svedberg |
| 4,276,010 A | 6/1981 | Shartzer |
| 4,471,978 A | 9/1984 | Kramer |
| 4,490,576 A | 12/1984 | Bolante |
| 4,508,369 A | 4/1985 | Mode |
| 4,600,223 A | 7/1986 | De Vries |
| 4,749,214 A | 6/1988 | Hoskins |
| 4,779,902 A | 10/1988 | Lee |
| 4,781,400 A | 11/1988 | Cunningham |
| 4,854,397 A | 8/1989 | Warren |
| 4,875,713 A | 10/1989 | Carstensen |
| 4,875,714 A | 10/1989 | Lee |
| 4,927,185 A | 5/1990 | Naughton |
| 4,962,579 A | 10/1990 | Moyer et al. |
| 4,979,765 A | 12/1990 | Bartholomew |
| 5,005,877 A | 4/1991 | Hayman |
| 5,015,014 A | 5/1991 | Sweeney |
| 5,119,892 A | 6/1992 | Hawke |
| 5,219,188 A | 6/1993 | Abe |
| 5,251,942 A | 10/1993 | Whaley |
| 5,378,024 A | 1/1995 | Kumagai |
| 5,533,761 A | 7/1996 | Ostrander |
| 5,542,717 A | 8/1996 | Rea |
| 5,580,100 A | 12/1996 | Umezawa |
| 5,584,512 A | 12/1996 | Carstensen |
| 5,662,360 A | 9/1997 | Guzowski |
| 5,685,575 A | 11/1997 | Allread |
| 5,716,081 A | 2/1998 | Leigh-Monstevens |
| 5,738,388 A | 4/1998 | Sundelin |
| 5,826,921 A | 10/1998 | Woolley |
| 5,845,945 A | 12/1998 | Carstensen |
| 5,909,901 A | 6/1999 | Zillig |
| 5,918,914 A | 7/1999 | Morris |
| 5,934,709 A | 8/1999 | Morrison |
| 5,971,445 A | 10/1999 | Norkey |
| 5,975,591 A | 11/1999 | Guest |
| 5,988,704 A | 11/1999 | Rhyman |
| 5,988,705 A | 11/1999 | Norkey |
| 6,062,326 A | 5/2000 | Strong |
| 6,152,496 A | 11/2000 | Kouda |
| 6,176,523 B1 | 1/2001 | Winslett |
| 6,325,424 B1 | 12/2001 | Metcalfe |
| 6,343,814 B1 | 2/2002 | Bucher |
| 6,401,820 B1 | 6/2002 | Kirk |
| 6,464,024 B2 | 10/2002 | Beaton |
| 6,499,771 B1 | 12/2002 | Snyder |
| 6,568,658 B2 | 5/2003 | Strome |
| 6,666,480 B2 | 12/2003 | Haney |
| 6,688,655 B1 | 2/2004 | Watanabe |
| 6,722,706 B2 | 4/2004 | Church |
| 6,964,435 B2 | 11/2005 | Wolf |
| 6,988,747 B2 | 1/2006 | Allen |
| 7,029,035 B2 | 4/2006 | Seymour |
| 7,097,211 B2 | 8/2006 | Adams |
| 7,261,326 B2 | 8/2007 | Haney |
| 7,264,281 B2 | 9/2007 | Le Quere |
| 7,425,024 B2 | 9/2008 | Haney |
| 7,445,247 B2 | 11/2008 | Ericksen |
| 7,445,250 B2 | 11/2008 | Swift |
| 7,455,328 B2 | 11/2008 | Chelchowski |
| 7,469,933 B2 | 12/2008 | Swift |
| 7,470,383 B2 | 12/2008 | Haney |
| 7,523,966 B2 | 4/2009 | O'Neill |
| 7,810,850 B2 | 10/2010 | O'Neill |
| 7,819,438 B2 | 10/2010 | Swift |
| 7,832,774 B2 | 11/2010 | Densel |
| 7,841,630 B1 | 11/2010 | Auray |
| 7,866,707 B2 | 1/2011 | Sudar |
| 7,963,570 B2 | 6/2011 | Swift |
| 8,342,579 B2 | 1/2013 | Hennemann |
| 8,516,678 B2 | 8/2013 | Hennemann |
| 2002/0148128 A1* | 10/2002 | Williams .............. F16L 19/075 33/501.45 |
| 2003/0094813 A1 | 5/2003 | Bucher |
| 2003/0116960 A1 | 6/2003 | Yates |
| 2003/0122372 A1 | 7/2003 | Muto |
| 2003/0155763 A1 | 8/2003 | Wolf |
| 2004/0070198 A1 | 4/2004 | Rohrig |
| 2004/0245766 A1 | 12/2004 | Vallee |
| 2006/0214422 A1 | 9/2006 | Cuvo |
| 2007/0001450 A1 | 1/2007 | Swift |
| 2008/0185838 A1 | 8/2008 | Sudar |
| 2008/0303274 A1 | 12/2008 | Mazzaferro et al. |
| 2009/0278347 A1 | 11/2009 | Kerin |
| 2010/0078934 A1 | 4/2010 | Matsunaga |
| 2010/0194098 A1 | 8/2010 | Hennemann et al. |
| 2010/0194104 A1 | 8/2010 | Hennemann et al. |
| 2010/0295299 A1 | 11/2010 | Ziu |
| 2011/0012339 A1 | 1/2011 | Hennemann |

FOREIGN PATENT DOCUMENTS

| | | |
|---|---|---|
| DE | 3717533 A1 | 2/1988 |
| EP | 0 664 405 1 | 7/1995 |
| EP | 1669 655 A1 | 6/2006 |
| EP | 1 703 191 A2 | 9/2006 |
| EP | 1 933 074 A2 | 6/2008 |
| FR | 2 810 087 A1 | 12/2001 |
| GB | 1 584 085 | 2/1981 |
| WO | WO 00/57096 | 9/2000 |
| WO | WO 2004/104365 | 12/2004 |

OTHER PUBLICATIONS

Mid-Continent, "PVC Water Well Casings and Screens" brochure, pp. MP00014-MP00017, published Apr. 1075, place of publication—unknown.

VMT Fibreglass Industries, "Glasspoll Fibreglass Reinforced Plastic Pipes and Screens" brochure, pp. 1-4, Jan. 1998, place of publication—unknown.

Eastern District of Pennsylvania, Order construing term predetermined interior diameter of U.S. Pat. No. 6,666,480 (Doc. No. 116), p. 1, Oct. 24, 2005, Civil Action No. 03-CV-2131, published on PACER (www.pacer.gov).

Eastern District of Pennsylvania, "Memorandum of Plaintiff Certainteed Corporation in Support of Motion for Summary Judgment of Invalidity of the Patent in Suit," (Doc. No. 92), pp. 4-7, 9-12, Sep. 19, 2005, Civil Action No. 03-CV-2131, published on PACER (www.pacer.gov).

Marcel Decker, Inc., Thomas Sixsmith, "Handbook of Thermoplastic Piping System Design," pp. 137-141, 1997, ISBN No. 0-8247-9846-5.

CertainTeed Corporation, "Kwik-SetC) Threaded Drop Pipe" brochure, p. 1, 2004, place of publication—unknown.

(56) References Cited

OTHER PUBLICATIONS http://www.sealechin.com/Technical/Product_Features, webpage printed Jan. 22, 2009.
Eastern District of Pennsylvania, Memorandum and Order construing certain claim terms of U.S. Pat. No. 6,666,480, (Doc. No. 75), pp. 1-19, May 2, 2005, Civil Action No. 03-CV-2131, published on PACER (www.pacer.gov).
Transcript of Nov. 18, 2004 deposition of Northern Products witness Victor Weigel, pp. 40-41, 85-91, Civil Action No. A3-04-18 in the North Dakota District Court, Southeastern Division.
Brochure of Sea Tech, Inc. for "10 Series Quick-Connect fitting and values" dated 2008.
U.S. Patent and Trademark Office, U.S. Appl. No. 12/365,000 Final Office Action dated Jul. 25, 2011, pp. 1-11.
U.S. Patent and Trademark Office, U.S. Appl. No. 12/365,000, Non-Final Office Action dated May 4, 2012, pp. 1-7.
U.S. Patent and Trademark Office, U.S. Appl. No. 12/365,000, Non-Final Office Action dated Dec. 15, 2010, pp. 1-12.
U.S. Patent and Trademark Office, U.S. Appl. No. 12/365,000, Non-Final Office Action dated Dec. 16, 2011, pp. 1-10.
U.S. Patent and Trademark Office, U.S. Appl. No. 12/494,073, Final Office Action dated Feb. 21, 2014, pp. 1-18.
U.S. Patent and Trademark Office, U.S. Appl. No. 12/494,073, Final Office Action dated Dec. 26, 2012, pp. 1-16.
U.S. Patent and Trademark Office, U.S. Appl. No. 12/494,073, Non-Final Office Action dated Dec. 16, 2011, pp. 1-16.
U.S. Patent and Trademark Office, U.S. Appl. No. 12/891,544, Final Office Action dated Jan. 9, 2013, pp. 1-44.
U.S. Patent and Trademark Office, U.S. Appl. No. 12/891,544, Final Office Action dated Aug. 2, 2013, pp. 1-7.
U.S. Patent and Trademark Office, U.S. Appl. No. 12/891,544, Non-Final Office Action dated Apr. 25, 2013, pp. 1-15.
U.S. Patent and Trademark Office, U.S. Appl. No. 12/891,544, Non-Final Office Action dated Jul. 25, 2012, pp. 1-34.
U.S. Patent and Trademark Office, U.S. Appl. No. 12/891,544, Non-Final Office Action dated Nov. 8, 2013, pp. 1-15.
U.S. Patent and Trademark Office, U.S. Appl. No. 12/956,402, Non-Final Office Action dated Dec. 31, 2012, pp. 1-5.
PCT Notification of Transmittal of the International Search Report and the Written Opinion of the International Searching Authority, or the Declarations, for PCT/US14/28259, dated Mar. 27, 2015, 16 pages.
European Patent Office, European Application No. 10006705.7 Office Action dated Jul. 9, 2014, 5 pages.
European Patent Office, European Application No. 10250178.0, Office Action dated Oct. 27, 2014, 6 pages.
International Bureau, Notification Concerning Transmittal of International Preliminary Report on Patentability and International Preliminary Report on Patentability, dated Sep. 15, 2015 for Application No. PCT/US2014/028259, 10 pages.
Application and File History for U.S. Appl. No. 14/212,847, filed Mar. 14, 2014. Inventors: Hennemann et al.

* cited by examiner

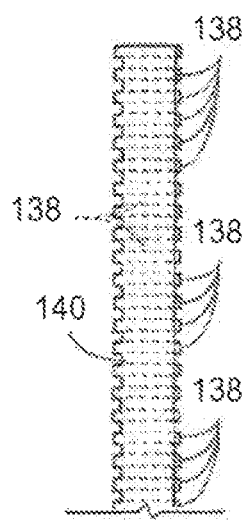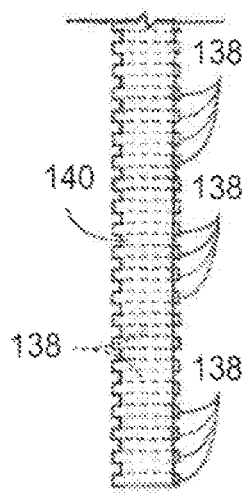
FIG. 7A
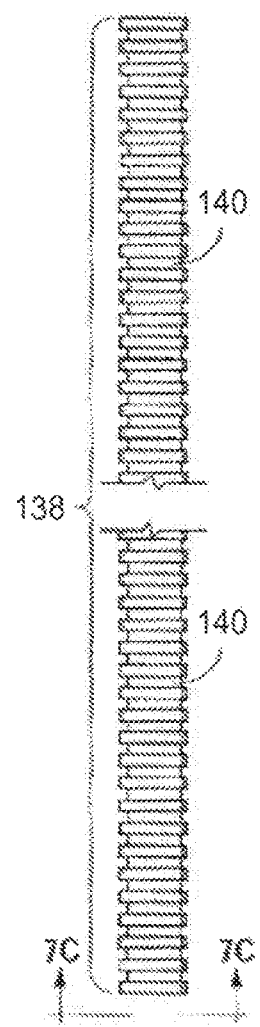
FIG. 7B
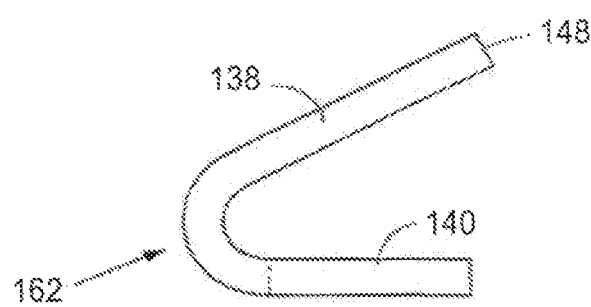
FIG. 7C

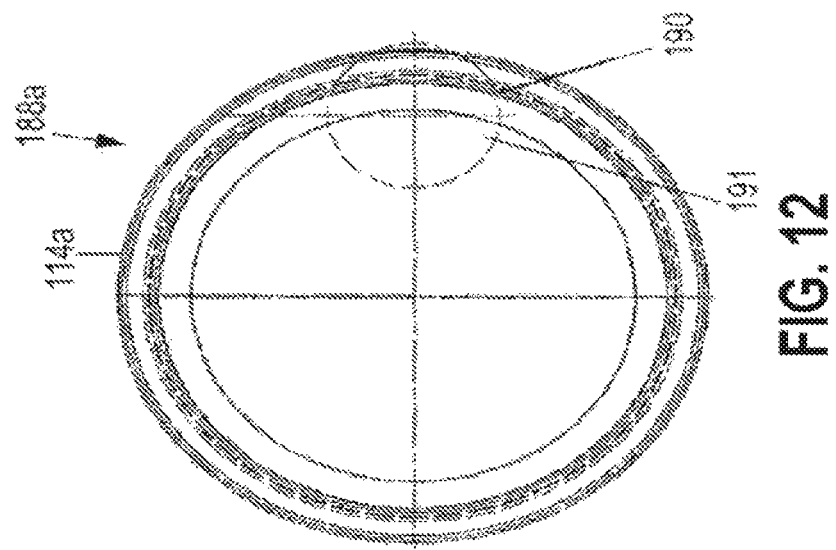
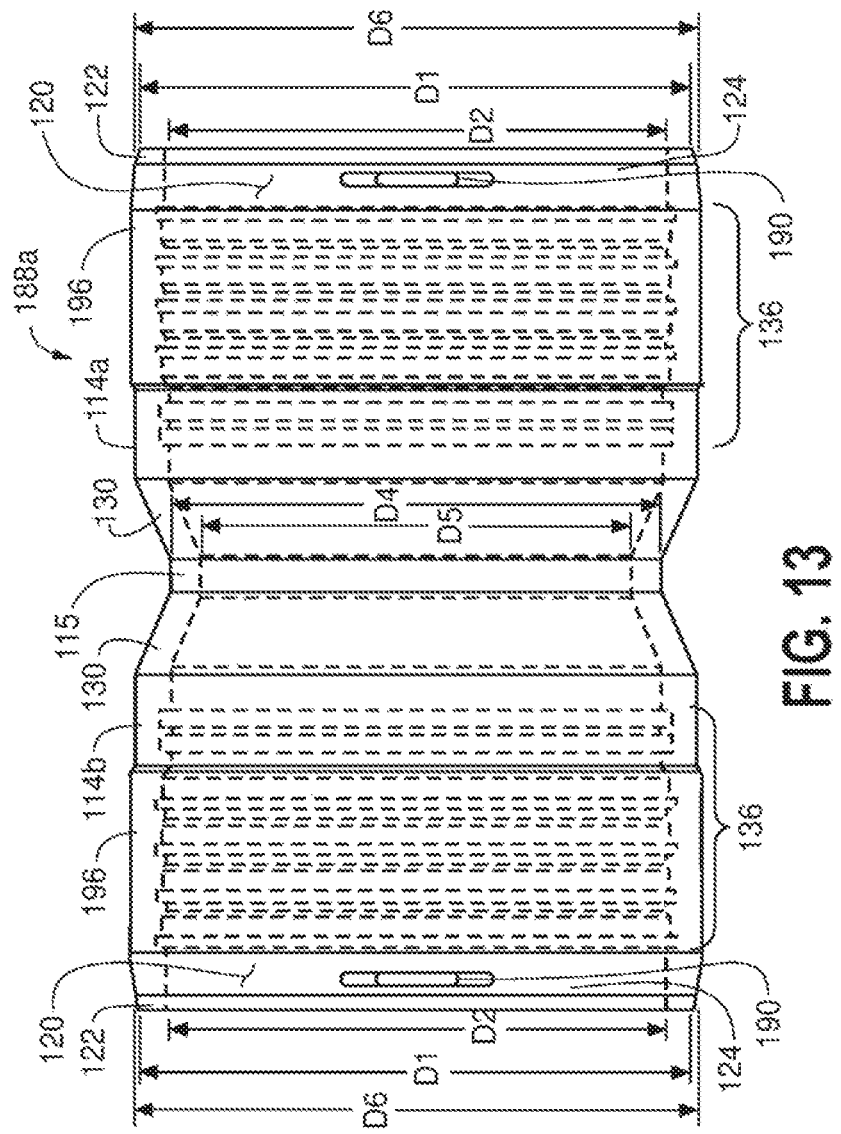
FIG. 12
FIG. 13

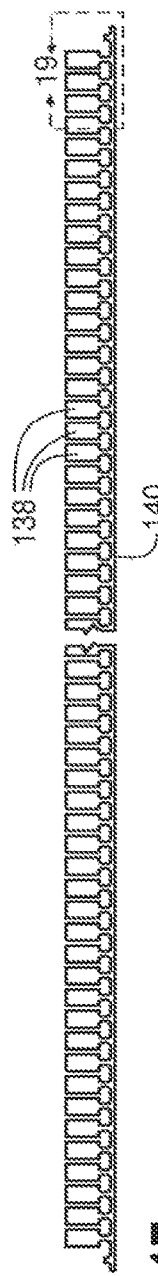
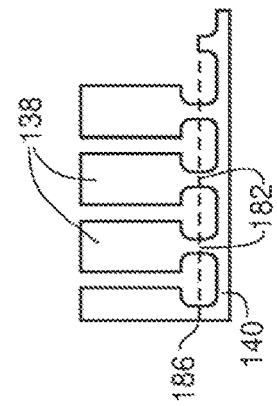
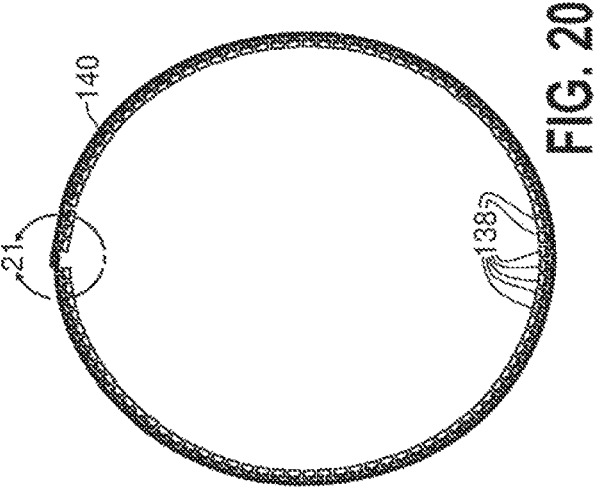
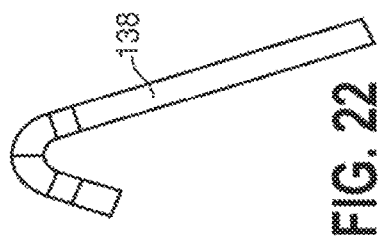
FIG. 17
FIG. 18
FIG. 19
FIG. 20
FIG. 21
FIG. 22

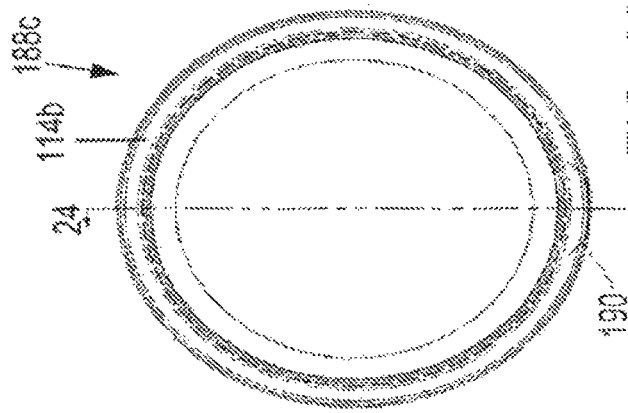
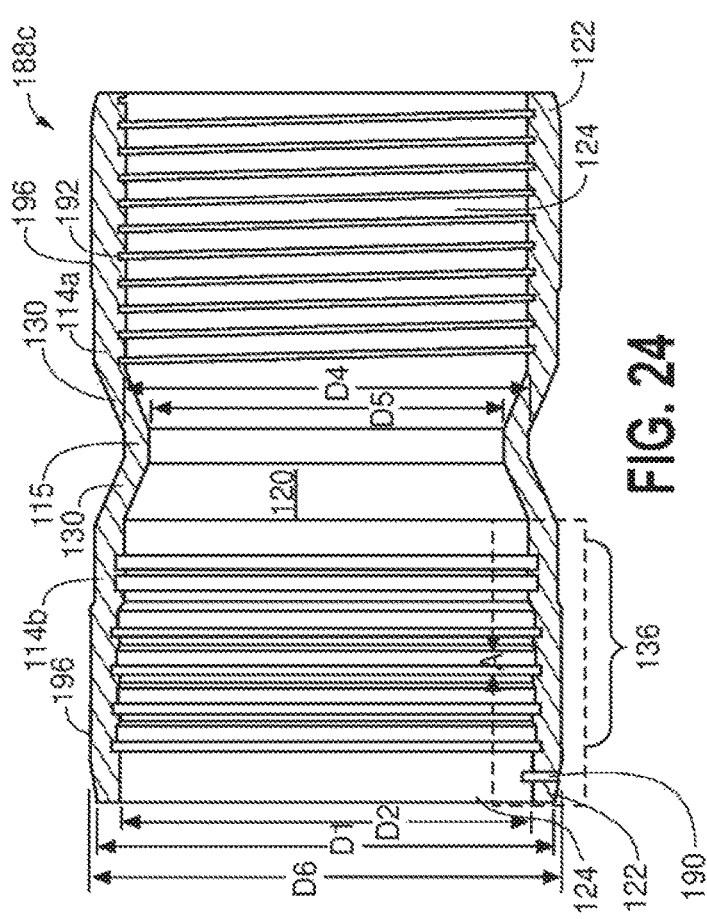
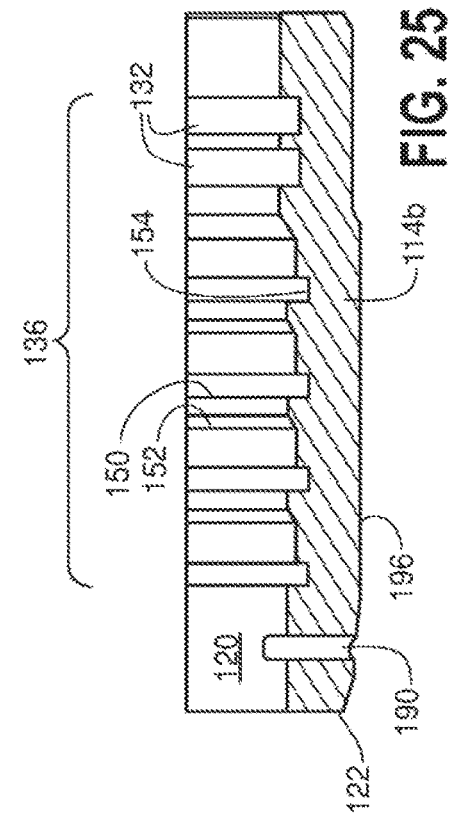

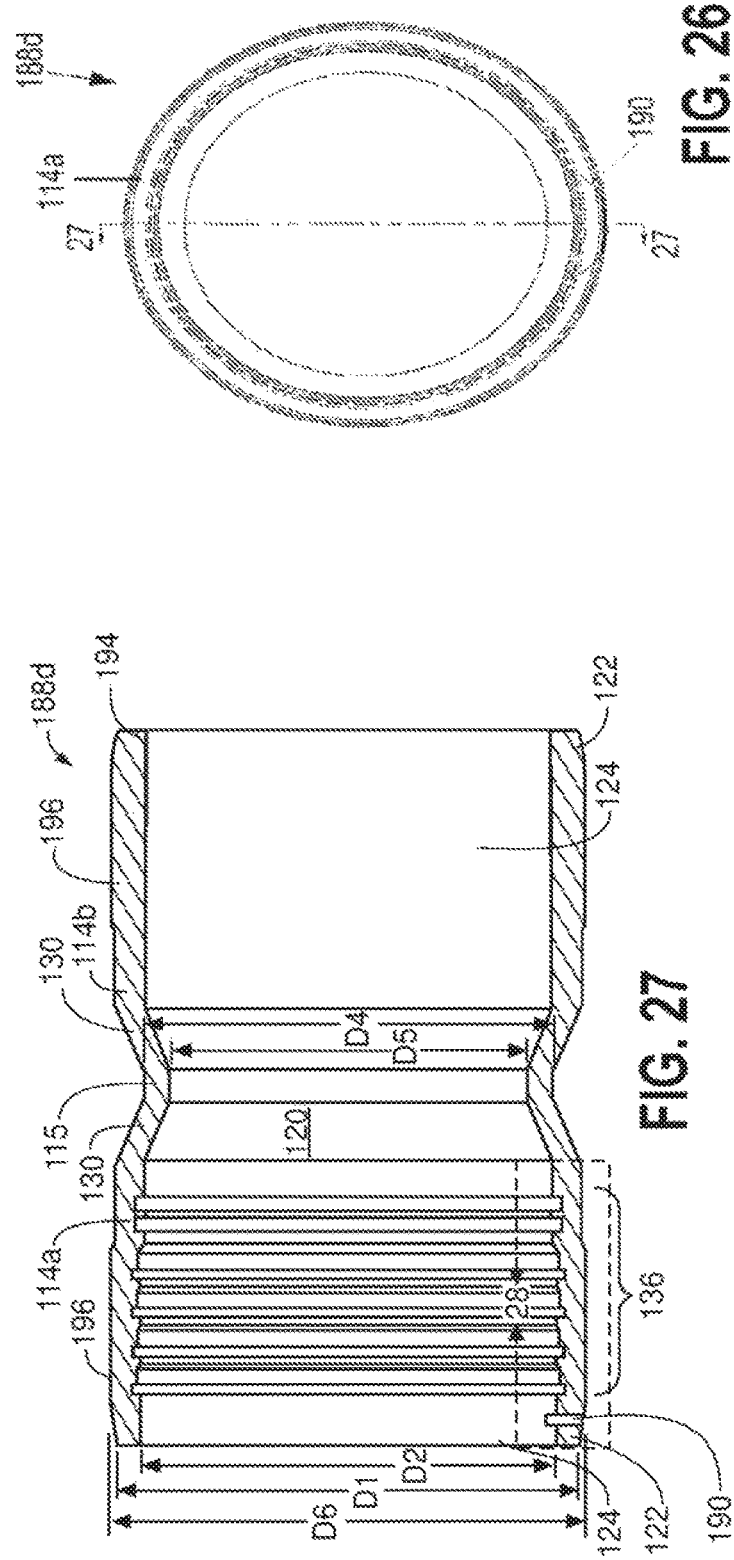
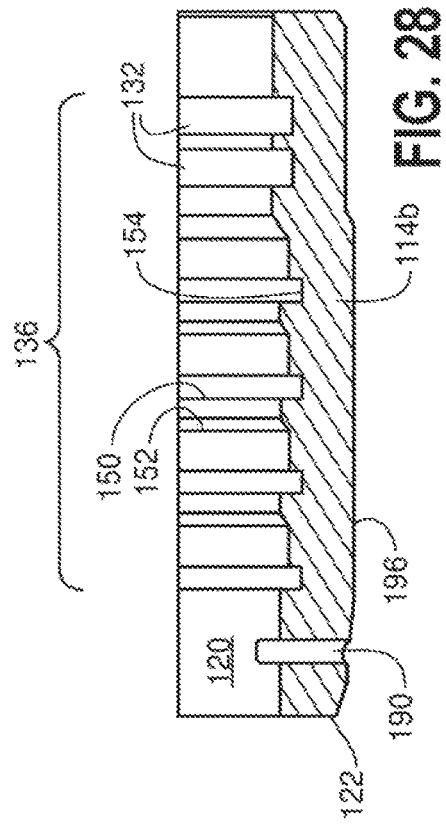

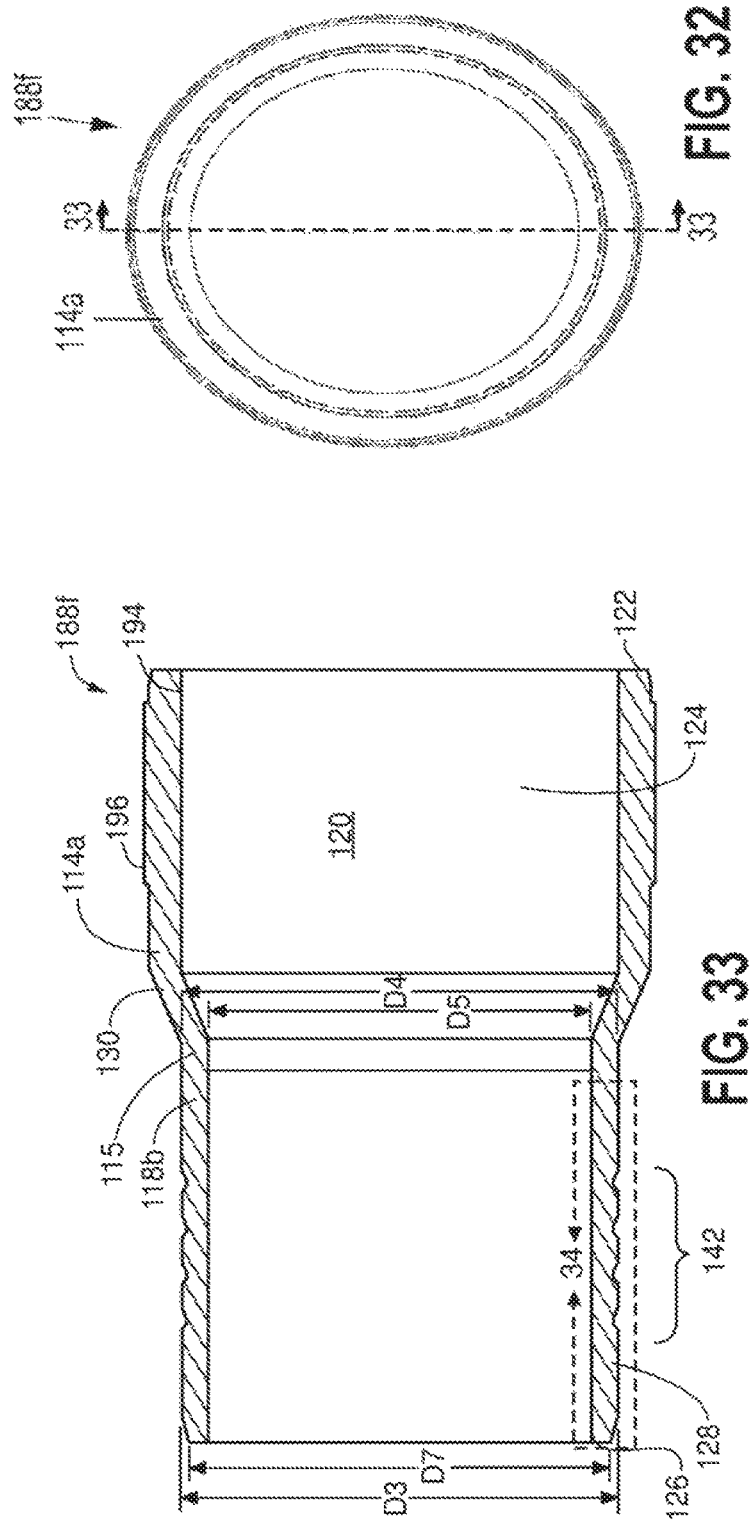

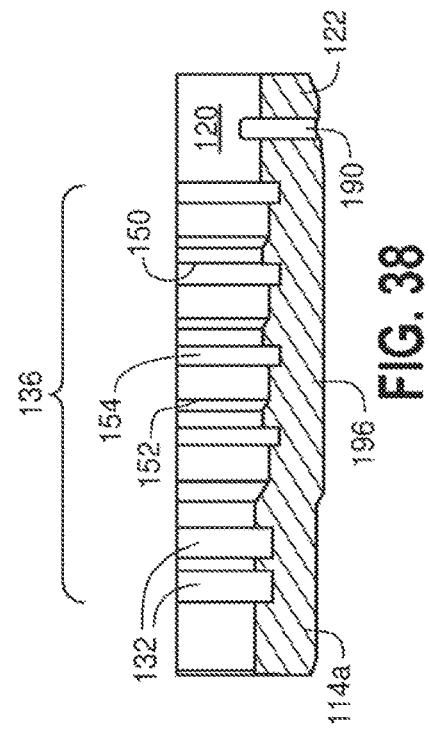
FIG. 35
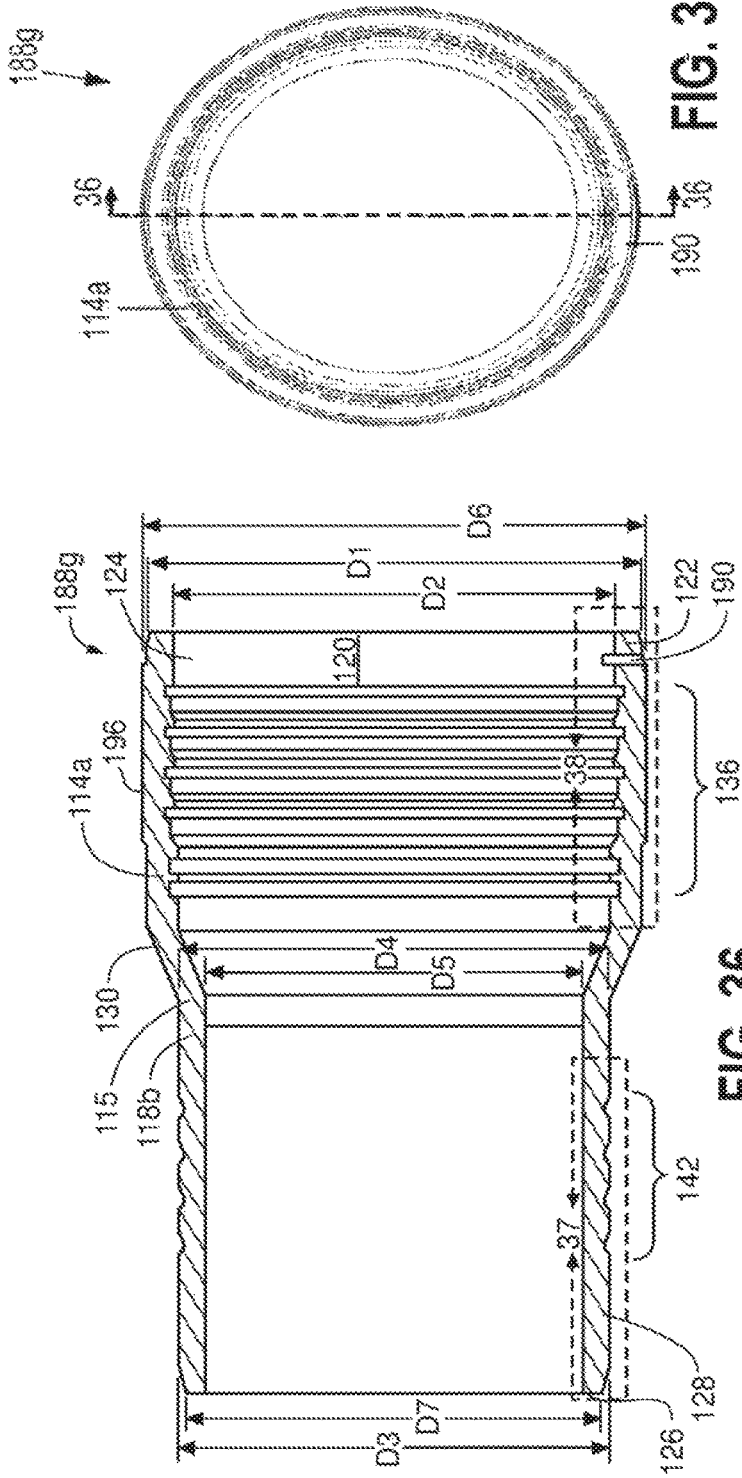
FIG. 36
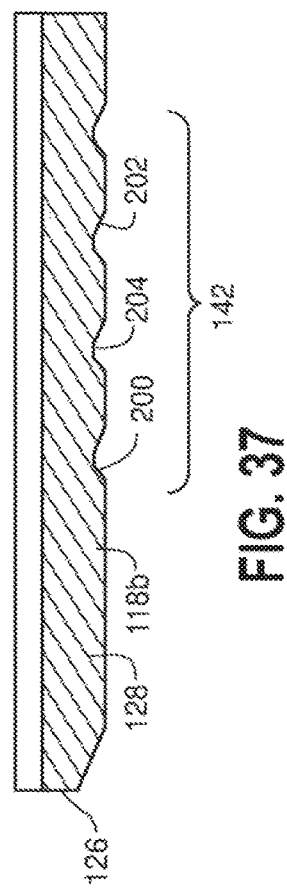
FIG. 38
FIG. 37

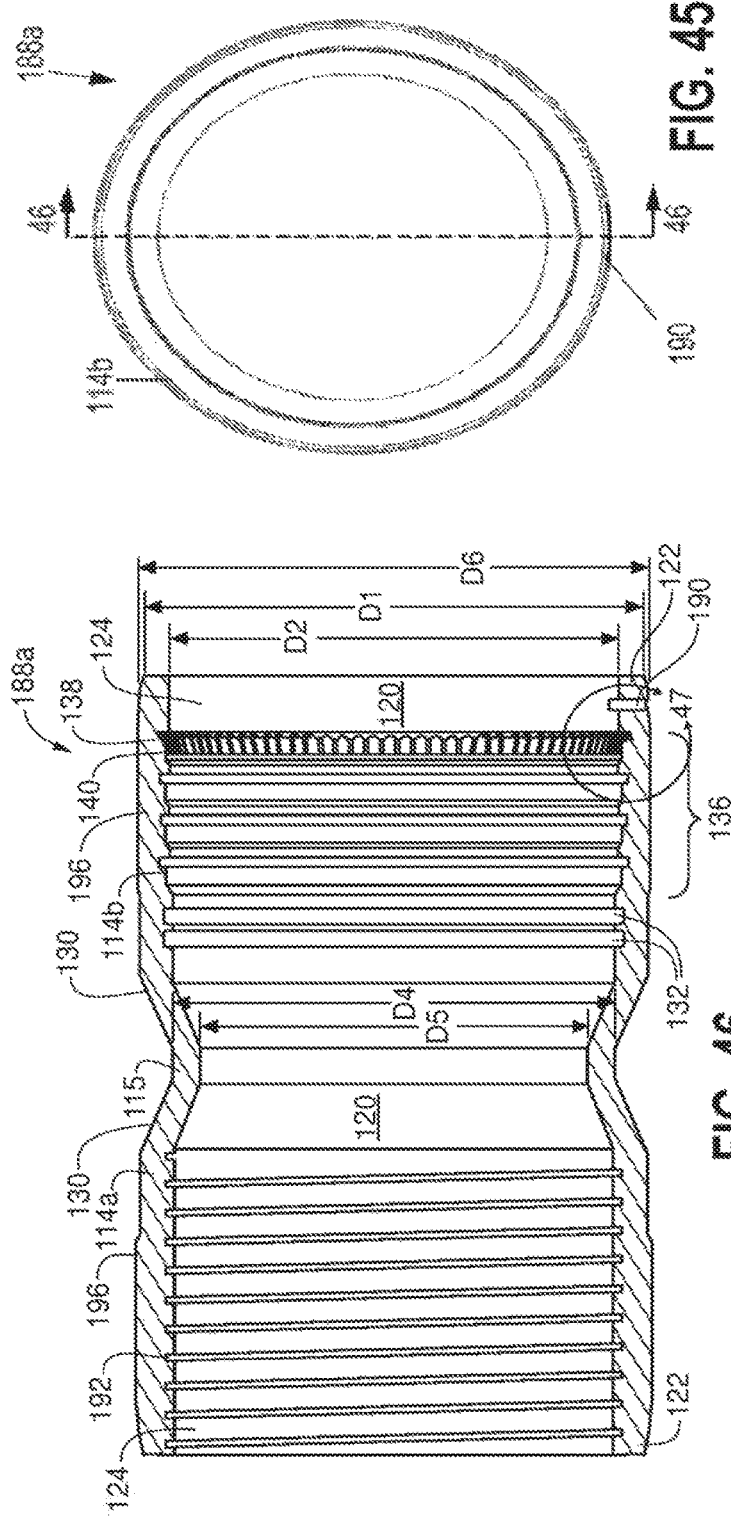

PIPE COUPLING

CROSS-REFERENCE TO RELATED APPLICATION

This application is a continuation of application Ser. No. 14/212,847, filed Mar. 14, 2014, entitled "Pipe Coupling", now U.S. Pat. No. 10,221,977, issued Mar. 5, 2019, which in turn is a continuation-in-part of U.S. application Ser. No. 12/494,073, filed on Jun. 29, 2009, and entitled "Male Push Lock Pipe Connection System," now U.S. Pat. No. 9,810,358, issued Nov. 7, 2017, which is a continuation-in-part of U.S. application Ser. No. 12/365,000, filed on Feb. 3, 2009, "entitled "Push Lock Pipe Connection System," now issued as U.S. Pat. No. 8,342,579, issued Jan. 1, 2013. This patent application also claims the benefit of the priority of U.S. Patent Application No. 61/802,142, filed on Mar. 15, 2013, and entitled "Quickloc Coupling Design." each of which is hereby fully incorporated herein by reference.

TECHNICAL FIELD

Embodiments disclosed herein relate generally to pipe couplings and methods of securely connecting pipes with the couplings, regardless of the material from which the pipes are manufactured, and in particular may relate to providing restrained connections of pipe joints between fittings such as couplings when connecting to adjacent pipe.

BACKGROUND

In piping systems, there is a variety of ways to connect or join two separate lengths of pipe. In general, connections between two lengths of pipe traditionally have been achieved through one of four ways: (1) gluing or cementing; (2) welding; (3) threading; or (4) external connections such as collars and flanges. In gluing or cementing, an adhesive is applied to the male end, to the female end, or to both ends of the pipes being joined. The male end of one pipe is inserted into the female end of the adjacent pipe being joined and the adhesive cures, permanently joining the pipes. With welding, two metal pipes are joined using molten metal. In threading, the male end of a pipe has external threads and the female end of the adjacent pipe has internal threads. The male end is inserted into the female end of the adjacent pipe, the pipes are rotated, and the threads engage each other. With external connections such as collars and flanges, some sort of threaded fastener interacts with the external connecting structure to securely lock the connection between the two pipes.

Each of the aforementioned connection types has certain disadvantages. For example, a glued or cemented connection can be cumbersome and time consuming. The pipe surfaces must be cleaned and the adhesive applied and allowed to cure before the connection can withstand tensile force. Further, the pipes cannot be disconnected without destruction of at least a portion of the pipe. In threaded connections, the connection can be achieved quicker and the pipes usually can be disconnected and reused, but threaded connections typically cannot withstand high tensile forces. In addition, threaded connections can be cross-threaded relatively easily and require tools to grip, hold, and turn the pipes. Welded connections can withstand significant tensile forces but can only be used on metal pipes. Further, creating the weld is a time-consuming task, and, once the weld is formed it is difficult to remove and may not be possible without pipe destruction. With external connections, the connection often can be removed and can withstand significant tensile forces, but forming the connection is also a time-consuming task.

Accordingly, there is a need for a pipe coupling that allows a connection that will withstand large tensile forces, can be quickly formed with similar adjacent pipes, and can be easily disconnected with the proper tool, regardless of the material from which the pipe is made.

SUMMARY

The pipe coupling of embodiments disclosed herein may provide a connection that can be quickly formed between pipes of the same or different materials. Furthermore, embodiments disclosed herein enable adjacent pipes with the same or different connective ends to be coupled together in a variety of configurations—female end to male end, female end to female end, or male end to male end. Embodiments disclosed herein may also enable the conversion of a pipe's male or female end from a standard fitting (e.g., threaded, welded, adhesive, or another type of coupling method) to the push-lock connection system described herein. In addition, the connection formed between two adjacent pipes may have comparatively high tensile yield strengths. Embodiments disclosed herein may offer a quick connection of two lengths of pipe without gluing, threading, or welding, as well as other advantages.

In some embodiments, the pipe coupling has a female end for receiving a male end of an adjacent pipe. In other embodiments, the pipe coupling has a male end to be received by a female end of an adjacent pipe. In still other embodiments, the pipe coupling has two female ends for receiving two male ends of similar adjacent pipes. In alternative embodiments, the pipe coupling has two male ends to be received by two female ends of similar adjacent pipes.

The female end of the pipe coupling has a female leading edge and an interior surface, which defines a male end receiving chamber within the female end. The male end receiving chamber will ultimately receive the male end of a similar adjacent pipe. The male end of the pipe coupling has a male leading edge, which leads the male end into the male end receiving chamber of the female end of a similar adjacent pipe. The male end has an outer circumference which is smaller in diameter than the diameter of the male end receiving chamber on the female end.

In some embodiments, the interior surface of the female end has at least one and preferably a plurality of interior circumferential grooves disposed on it. Rigid fingers extend from these interior circumferential grooves into the male end receiving chamber. Preferably, the rigid fingers extending from each interior circumferential groove are connected to a band seated within each of the interior circumferential grooves. Disposed on the exterior surface of the male end are at least one and preferably a plurality of exterior circumferential grooves. The number of exterior circumferential grooves will typically correspond to the number of interior circumferential grooves disposed on the interior surface of the female end of a similar adjacent pipe. The exterior circumferential grooves on the male end are configured to receive the rigid fingers extending into the male end receiving chamber of the female end on the pipe coupling or a similar adjacent pipe. During the insertion of the male end into the male end receiving chamber, the rigid fingers are displaced toward the interior surface of the female end so that the male end can be fully inserted into the female end. When the male end is fully inserted into the male end receiving chamber the rigid fingers extending from the interior circumferential grooves on the female end are positioned within corresponding exterior circumferential grooves on the male end. The rigid fingers and their positioning within the corresponding exterior circumferential grooves prevent the male end from being withdrawn.

Alternatively, the male end and/or the female end of the pipe coupling or a similar adjacent pipe may have no circumferential grooves and may include threading, a weld, an adhesive, or another type of connection.

In accordance with one embodiment disclosed herein, a pipe coupling for connecting adjacent pipes is provided. The pipe coupling includes a first end of a body of the pipe coupling of a first connection type, and a second end of a body of the pipe coupling opposite from, integral with, and seamless with the first end and of a second connection type. The second connection type includes a female end with an interior surface, a thickness, and a female leading edge terminating the female end of the coupling. The interior surface of the female end defines a receiving chamber. At least one interior circumferential first groove is formed in the interior surface of the female end. A band is seated within the at least one circumferential first groove. A plurality of rigid fingers is formed continuously with and extending from the band into the receiving chamber at an acute angle directed away from the female leading edge, with the plurality of rigid fingers being displaceable. A separate removal tool may be required to disconnect the coupling from an adjacent pipe; the necessity for such a tool may prevent accidental disconnects.

In some embodiments and in combination with the above embodiment, the receiving chamber is configured to receive a male end of an adjacent pipe, the male end having a male leading edge and an exterior surface. The exterior surface has a circumference smaller in diameter than an inside diameter of the receiving chamber of the female end. At least one exterior circumferential groove is defined on the exterior surface of the male end being sized and positioned to receive therein the plurality of rigid fingers extending from a corresponding at least one interior first circumferential groove in the female end. In some such embodiments, the female end defines a sight window comprising an opening extending through the thickness of the female end and configured to permit viewing of the position of a male end of an adjacent pipe within the receiving chamber. In some such embodiments, the pipe coupling has a longitudinal axis, and the sight window is elongated in a direction perpendicular to the pipe coupling longitudinal axis and is proximate to the female leading edge.

In some embodiments and in combination with any of the above embodiments, the first connection type is the same as the second connection type. In some embodiments and in combination with any of the above embodiments, the first connection type is a female threaded end, configured to at least partially receive a threaded male end of an adjacent pipe, or a threaded male end configured to be at least partially received by a threaded female end of an adjacent pipe. In some embodiments and in combination with any of the above embodiments, the first connection type is a smooth female end configured to at least partially receive a smooth male end of an adjacent pipe, or a smooth male end configured to be at least partially received by a smooth female end of an adjacent pipe.

In some embodiments and in combination with any of the above embodiments, the first connection type is a male end having a male leading edge and an exterior surface, the exterior surface having a circumference smaller in diameter than an inside diameter of the receiving chamber of the female end. At least one exterior circumferential groove is defined on the exterior surface of the male end being sized and positioned to receive therein the plurality of rigid fingers extending from a corresponding at least one interior first circumferential groove in a female end of an adjacent pipe configured as the second connection type. In some such embodiments, the female end defines a sight window including an opening extending through the thickness of the female end and configured to permit viewing of the position of a male end of an adjacent pipe within the receiving chamber, and wherein the exterior surface of the male end includes an indication that when viewed through the sight window indicates that the male end has been fully inserted into the female end. In some such embodiments, the indication on the exterior surface of the male end includes a coating differing in appearance from the exterior surface. In other such embodiments, the indication on the exterior surface of the male end comprises a groove defined in the exterior surface.

In some embodiments and in combination with any of the above embodiments, the receiving chamber has a first diameter in a first portion of the receiving chamber proximate to the female leading edge, and a lesser, second diameter in a second portion of the receiving chamber adjacent to the first portion.

In some embodiments and in combination with any of the above embodiments, the second joint type further comprises at least one interior circumferential second groove formed in the interior surface of the female end within the second portion, and a sealing ring disposed in the second groove.

In accordance with another embodiment disclosed herein, another pipe coupling for connecting adjacent pipes is provided, including a first end of a body of a first connection type and a second end of a body opposite from, integral with, and seamless with the first end and of a second connection type. The second connection type includes a male end having a male leading edge and an exterior surface, the exterior surface having a circumference, where at least one exterior circumferential groove is defined on the exterior surface of the male end being sized and positioned to receive therein a plurality of rigid fingers. The male end is configured to be received by a third connection type on an adjacent pipe. The third connection type includes a female end with an interior surface, a thickness, and a female leading edge terminating the female end of the coupling. The interior surface of the female end defining a receiving chamber with an interior diameter larger than the diameter of the exterior of the male end. At least one interior circumferential groove is formed in the interior surface of the female end, and a band is seated within the at least one circumferential groove. A plurality of rigid fingers is formed continuously with and extending from the band into the receiving chamber at an acute angle directed away from the female leading edge, with the plurality of rigid fingers being displaceable to be received in a corresponding exterior circumferential groove of the male end.

In some embodiment and in combination with the above embodiment, the first connection type is the same as the second connection type. In some embodiments and in combination with any of the above embodiments, the first connection type is a female threaded end, configured to at least partially receive a threaded male end of an adjacent pipe, or a threaded male end configured to be at least partially received by a threaded female end of an adjacent pipe. In some embodiments and in combination with any of the above embodiments, the first connection type is a smooth female end configured to at least partially receive a smooth male end of an adjacent pipe, or a smooth male end configured to be at least partially received by a smooth female end of an adjacent pipe.

In some embodiments and in combination with any of the above embodiments, the exterior surface of the male end includes an indication configured to indicate that the male end has been fully inserted into the female end when viewed through a sight window defined in the female end, the sight window comprising an opening extending through the thickness of the female end to permit viewing of the position of a male end of an adjacent pipe within the receiving chamber. In some such embodiments, the indication on the exterior surface of the male end includes a coating differing in appearance from the exterior surface. In other such embodiments, the indication on the exterior surface of the male end comprises a groove defined in the exterior surface.

In accordance with another embodiment disclosed herein, a method of coupling adjacent pipes is provided. A first connection type is provided on one end of a pipe or a pipe coupling, including a female end with an interior surface, a thickness, and a female leading edge terminating the female end of the coupling. The interior surface of the female end defines a receiving chamber. The female end defines a sight window comprising an opening extending through the thickness of the female end and configured to permit viewing of the position of a male end of an adjacent pipe within the receiving chamber. A second connection type is provide on one end the other of a pipe or a pipe coupling, including a male end having a male leading edge and an exterior surface. The exterior surface has a circumference smaller in diameter than an inside diameter of the receiving chamber of the female end, where at least one exterior circumferential groove is defined on the exterior surface of the male end being sized and positioned to receive therein the plurality of rigid fingers extending from a corresponding at least one interior first circumferential groove in a female end of an adjacent pipe configured as the second joint type. The male end exterior surface includes an indication that when viewed through the sight window indicates that the male end has been fully inserted into the female end. The method includes inserting the male end into the female end and continuing such insertion until the indication on the exterior surface of the male pipe can be viewed through the sight window.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 7A is back view of a portion of a set of rigid fingers extending from a band to be seated within an interior circumferential groove on a female end of one pipe.

FIG. 7B is a front view of a portion of the set of rigid fingers of FIG. 7A.

FIG. 7C is a side view of a single finger from the set of rigid fingers of FIG. 7A.

FIG. 12 is another end view of the coupling of FIG. 9, rotated 90 degrees from the view of FIG. 9, showing a representation of a window cutting wheel.

FIG. 13 is a side view of the coupling of FIG. 9, rotated 90 degrees from the view of FIG. 10, showing an embodiment of a sight window.

FIG. 17 is a front view of a set of rigid fingers extending from a band with a finger removed from each end of the band prior to bending the fingers, in accordance with embodiments disclosed herein.

FIG. 18 is a front view of a set of rigid fingers of FIG. 17 after the fingers have been bent, in accordance with embodiments disclosed herein.

FIG. 19 is a detailed front view of rigid fingers of FIG. 17 prior to bending the fingers.

FIG. 20 is a top view of the rigid-fingered band of FIG. 17 with ends of the band being welded together after the fingers have been bent.

FIG. 21 is a detailed top view of ends of the welded rigid-fingered band of FIG. 20.

FIG. 22 is a side profile view of a finger extending from a band after it has been bent, in accordance with embodiments disclosed herein.

FIG. 23 is an end view of a pipe coupling having a female end with the push-lock connection system of FIG. 1 at a first end and an opposite female end that is threaded at a second end of the pipe coupling, in accordance with embodiments disclosed herein.

FIG. 24 is a cross sectional side view of the coupling of FIG. 23 taken along line 24-24 of FIG. 23.

FIG. 25 a detailed partial cutaway view of one end of the coupling of FIG. 23 showing interior circumferential grooves.

FIG. 26 is an end view of a pipe coupling having a female end with the push-lock connection system of FIG. 1 at a first end and an opposite female end that is plain and unthreaded at a second end of the pipe coupling, configured to receive an adhesive, in accordance with embodiments disclosed herein.

FIG. 27 is a cross sectional side view of the coupling of FIG. 26 taken along line 27-27 of FIG. 26.

FIG. 28 is detailed partial cutaway view of one end of the coupling of FIG. 23 showing interior circumferential grooves and a sight window.

FIG. 32 is an end view of a pipe coupling having a male end with the push-lock connection system of FIG. 1 at one end and an unthreaded female end configured to receive an adhesive at a second end of the pipe coupling, in accordance with embodiments disclosed herein.

FIG. 33 is a cross sectional side view of the coupling of FIG. 32 taken along line 33-33 of FIG. 32.

FIG. 34 is a detailed partial cutaway view of the coupling of FIG. 32 showing exterior circumferential grooves in the male end of the coupling.

FIG. 35 is an end view of a pipe coupling having a male end with the push-lock connection system of FIG. 1 at one end and a female end of the push-lock connection system of FIG. 1 at a second end of the coupling, in accordance with embodiments disclosed herein.

FIG. 36 is a cross sectional side view of the coupling of FIG. 35 taken along line 36-36 of FIG. 35.

FIG. 37 is a detailed partial cutaway view of the coupling of FIG. 35 showing exterior circumferential grooves in the male end of the coupling.

FIG. 38 is a detailed partial cutaway view of the coupling of FIG. 32 showing interior circumferential grooves in the female end of the coupling and sight window, in accordance with embodiments disclosed herein.

FIG. 45 is an end view of a pipe coupling having a female end with the push-lock connection system of FIG. 1 at one end and a threaded female end at a second end of the pipe coupling, as an opposite view of FIG. 24, in accordance with embodiments disclosed herein.

FIG. 46 is a cross sectional side view of the coupling of FIG. 45 taken along line 46-46 of FIG. 45, as a reverse view of FIG. 24 and showing an exemplary band with rigid fingers seated in an interior circumferential groove of the female end.

FIG. 47 is a detail view of the female end of the coupling of FIG. 45 showing the band of rigid fingers seated in one of a plurality of interior circumferential grooves similar to the push-lock connection system of FIG. 1.

Figure 1:
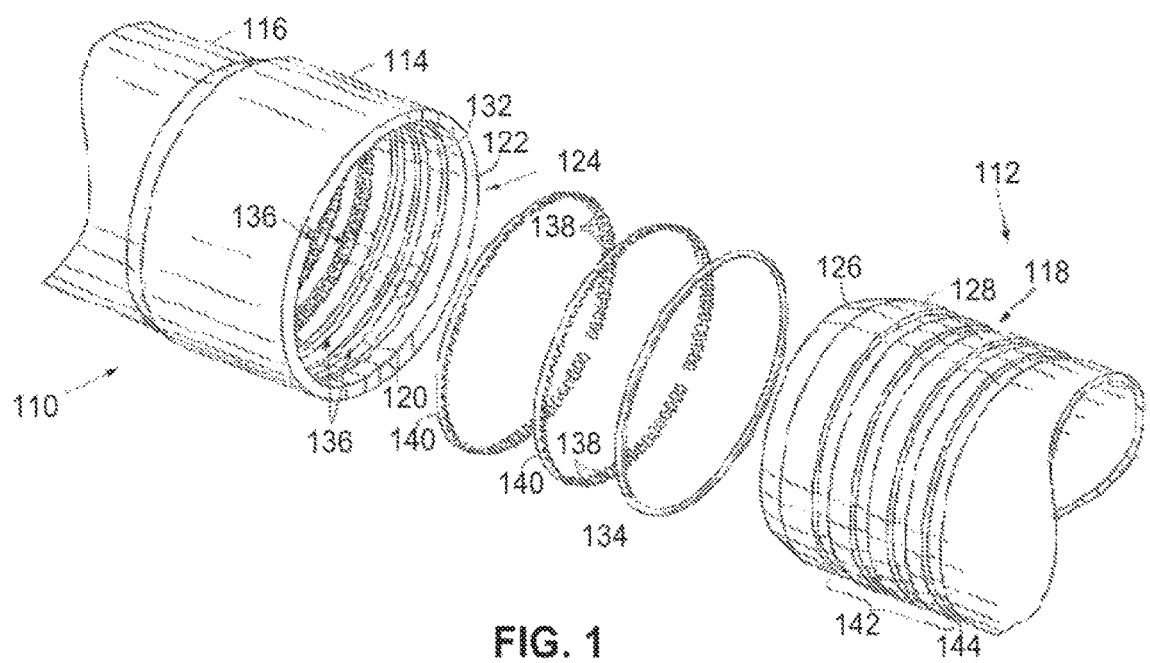
FIG. 1 is an exploded perspective view of a female end of one pipe and a male end of a similar adjacent pipe, each configured to form an embodiment of a unique push-lock connection system for a joint.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The following detailed description of embodiments refers to the accompanying drawings. Other embodiments having different structures and operation do not depart from the scope of the present disclosure. Certain terminology is used herein for convenience only and is not to be taken as a limitation on the embodiments described. For example, words such as "top", "bottom", "upper," "lower," "left," "right," "horizontal," "vertical," "upward," and "downward" merely describe the configuration shown in the figures or the orientation of a part in the installed position. Indeed, the referenced components may be oriented in any direction and the terminology, therefore, should be understood as encompassing such variations unless specified otherwise. Throughout this disclosure, where a process or method is shown or described, the method may be performed in any order or simultaneously, unless it is clear from the context that the method depends on certain actions being performed first. Like reference numerals refer to the same or similar parts throughout the drawings and specification.

Referring to FIGS. 1-8, a pipe 110 and a similar adjacent pipe 112 are shown for making an embodiment of a "push-lock connection system" as referred to herein. In practice, the pipe 110 has the same structure as the similar adjacent pipe 112 and therefore, a description of structure that is present for the similar adjacent pipe 112 in the figures applies equally to a description of the structure for the pipe 110, and vice versa. The contents of U.S. patent application Ser. No. 12/365,000 that was issued as U.S. Pat. Nos. 8,342,579, 8,342,579 (in which the pipe connection system of FIGS. 1-8 herein is disclosed), U.S. patent application Ser. No. 12/956,402 that was issued as U.S. Pat. Nos. 8,516,678, 8,516,678, and U.S. patent application Ser. No.

12/891,544 are hereby incorporated by reference in their entirety. Various coupling embodiments are disclosed herein for use with the unique "push-lock" connection system disclosed in the aforementioned patent and patent applications. Some of the couplings disclosed herein may be used to convert male ends of pipes using the push-lock connection system to female ends and vice versa. Additionally, some of the couplings may be used to convert portions of existing pipe systems to a push-lock connection system without having to remove and replace the entire existing pipe system.

Figure 2:
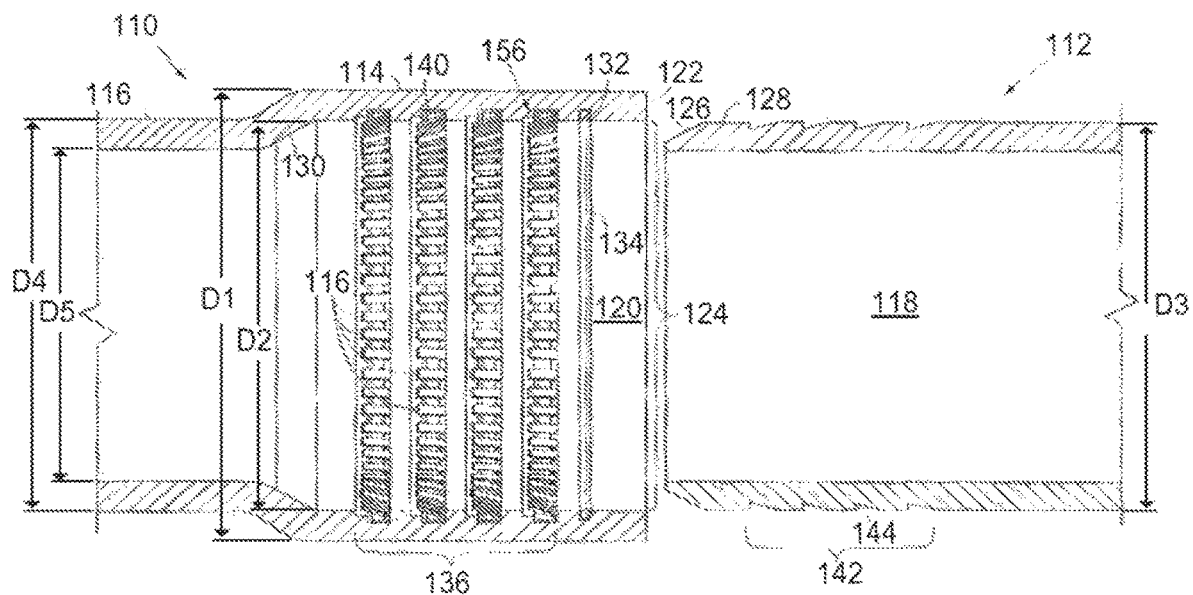
FIG. 2 is a cross sectional side view of the push-lock pipe connection system of FIG. 1.

The pipe 110 has a female end 114, an intermediate length 116, and a male end 118. Referring to FIGS. 1 and 2, the female end 114 has an interior surface 120 and a female leading edge 122 that terminates the female end 114. The female end 114 may have an outside diameter D1 and an inside diameter D2, enlarging from the outside diameter D4 and the inside diameter D5 of the intermediate length 116. The interior surface 120 of the female end 114 defines a male end receiving chamber 124, which is essentially the interior space within the female end 114. The male end 118 of the pipe 110 has a male leading edge 126 and an exterior surface 128 with a circumference (exterior diameter D3) that is smaller in diameter than diameter D2 of the male end receiving chamber 124 on the female end 114. Preferably the male end receiving chamber 124 will ultimately receive the male end 118 of the similar adjacent pipe 112 with minimal clearance when the pipes are connected and may create an interference fit; however, it is anticipated that certain applications may require a large clearance between connected pipes. The pipe 110 is sized according to the outer diameter D4 of its intermediate length 116 and has a tensile yield strength that is largely dependent on the material from which pipe 110 is made.

A stop member 130 is disposed within the pipe 110 preferably at the interior end of the male end receiving chamber 124. In the preferred embodiment, as shown in FIGS. 1-4, the diameter D2 of the male end receiving chamber 124 is larger than the interior diameter D5 of the intermediate length 116. As such, the stop member 130 in the preferred embodiment is a circumferential shoulder 156 formed by the reduction in diameter D2 from the male end receiving chamber 124 to the interior diameter D5 of the intermediate length 116. However, it is anticipated that stop member 130 could be other forms of circumferential shoulders, such as those present in "Flush Mount" connections or a shoulder on the exterior surface 128 of the male end 118. Additionally, in the preferred embodiment, at least one circumferential sealing groove 132 with an O-ring 134 seated therein is disposed on the interior surface 120 of the female end 114. However, it is anticipated that in certain applications the circumferential sealing groove 132 and the O-ring 134 may not be present, as the pipe 110 may include a different coupling mechanism.

The interior surface 120 of the female end 114 has a plurality of interior circumferential grooves 136 disposed on it. In the preferred embodiment, the number of interior circumferential grooves 136 is four. However, it is anticipated that this number could be greater than four, less than four, or even as few as one, depending upon the application.

Figure 5:
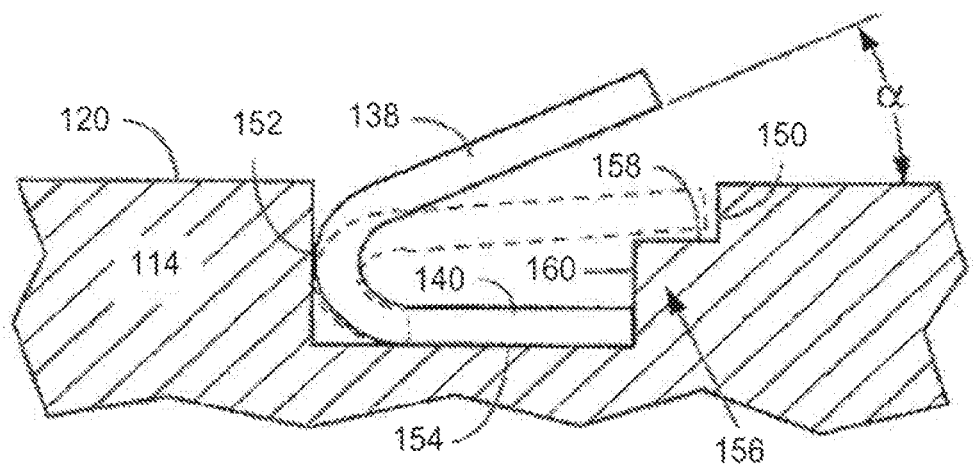
FIG. 5 is a cross sectional view showing a side profile of an interior circumferential groove on the female end of one pipe and a rigid finger from the plurality of rigid fingers extending from a band seated within the groove.

A plurality of sets of rigid fingers 138 extend from each of the interior circumferential grooves 136 and into the male end receiving chamber 124, forming an acute angle .alpha. between each of the rigid fingers 138 and the interior surface 120 of the female end 114 and directed away from the female leading edge 122 (see FIG. 5). In the preferred embodiment, the angle α formed between each of the rigid fingers 138 and the interior surface 120 measures between 27 degrees and 30 degrees inclusive.

Although rigid, each of the rigid fingers 138 is displaceable and can be radially displaced toward and away from the interior surface 120 of the female end 114. Further, each of the rigid fingers 138 is biased toward a non-displaced position (as shown in FIG. 7C) in the female end 114 and within the male end receiving chamber 124 unless acted upon by some force. Preferably, the rigid fingers 138 are made of stainless steel. However, any number of substantially rigid materials could be used, depending on the application and the tensile forces involved. In the preferred embodiment, each set of rigid fingers 138 extends from a band 140 (see FIGS. 7A, 7B, & 7C) that is seated within each of the interior circumferential grooves 136.

In some embodiments and as shown in FIG. 5, the interior circumferential grooves 136 have a generally rectangular cross section profile with a first side wall 150, a second sidewall 152, a bottom surface 154, and a shoulder 156 positioned adjacent the first side wall 150. The shoulder 156 has a top surface 158 and a side surface 160. In this embodiment, the band 140 is seated between the second sidewall 152 of the interior circumferential grooves 136 and the side surface 160 of the shoulder 156 such that the rigid fingers 138 extend above and over the shoulder 156. When the male end 118 is inserted into the female end 114, the minimal clearance there between will cause each set of rigid fingers 138 to be displaced at least partially, if not totally, into the interior circumferential grooves 136. In this regard, the distal end 148 of each of the rigid fingers 138 (see FIGS. 7A, 7B, & 7C) displaces into the space between the top surface 158 of the shoulder 156 and the top edge of the first sidewall 150 of the interior circumferential grooves 136.

Disposed on the exterior surface 128 of the male end 118 is a plurality of exterior circumferential grooves 142 with each groove having a sidewall 144 at the side of the groove nearest the male leading edge 126. A bottom surface 146 extends from the bottom edge of the sidewall 144 and slopes at an angle to the exterior surface 128 of the male end 118, forming acute angle 3 with the exterior surface 128 (see FIG. 6). Preferably, the angle 3 formed between the bottom surface 146 of the exterior circumferential grooves 142 and the exterior surface 128 of the male end 118 is approximately 16 degrees. As a result and depicted in FIG. 6, in the preferred embodiment the exterior circumferential grooves 142 have a triangular cross section profile formed by the sidewall 144 and the bottom surface 146. Preferably, the number of exterior circumferential grooves 142 on the male end 118 will correspond with the number of interior circumferential grooves 136 on the interior surface 120 of the female end 114.

Figure 3:
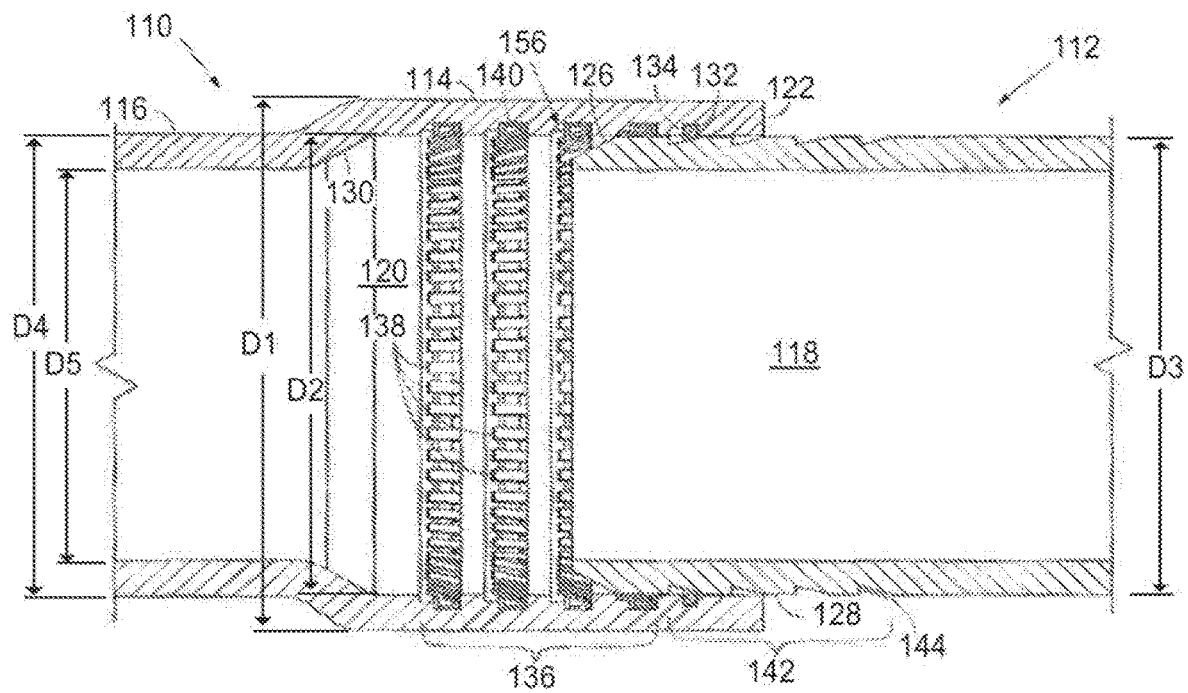
FIG. 3 is a cross sectional side view of the push-lock pipe connection system of FIG. 1 with the male end being partially inserted within the female end.

FIG. 3 shows the male end 118 of the similar adjacent pipe 112 partially inserted into the male end receiving chamber 124 of the female end 114 of the pipe 110. As shown, the male leading edge 126 of the male end 118 is beveled in the preferred embodiment of the pipe 110, with the bevel being set at an approximately 20 degrees radially inward angle with respect to the exterior surface 128 of the male end 118. The angling of the rigid fingers 138 away from the female leading edge 122 allows the male end 118 to be inserted into the male end receiving chamber 124, and, the insertion is facilitated by the bevel at the male leading edge 126 as well as the triangular cross section profile of the exterior circumferential grooves 142. As the male end 118 is inserted, the exterior surface 128 of the male end 118 contacts the sets of rigid fingers 138 and causes the rigid fingers 138 to be displaced toward the interior surface 120 of the female end 114.

Figure 4:
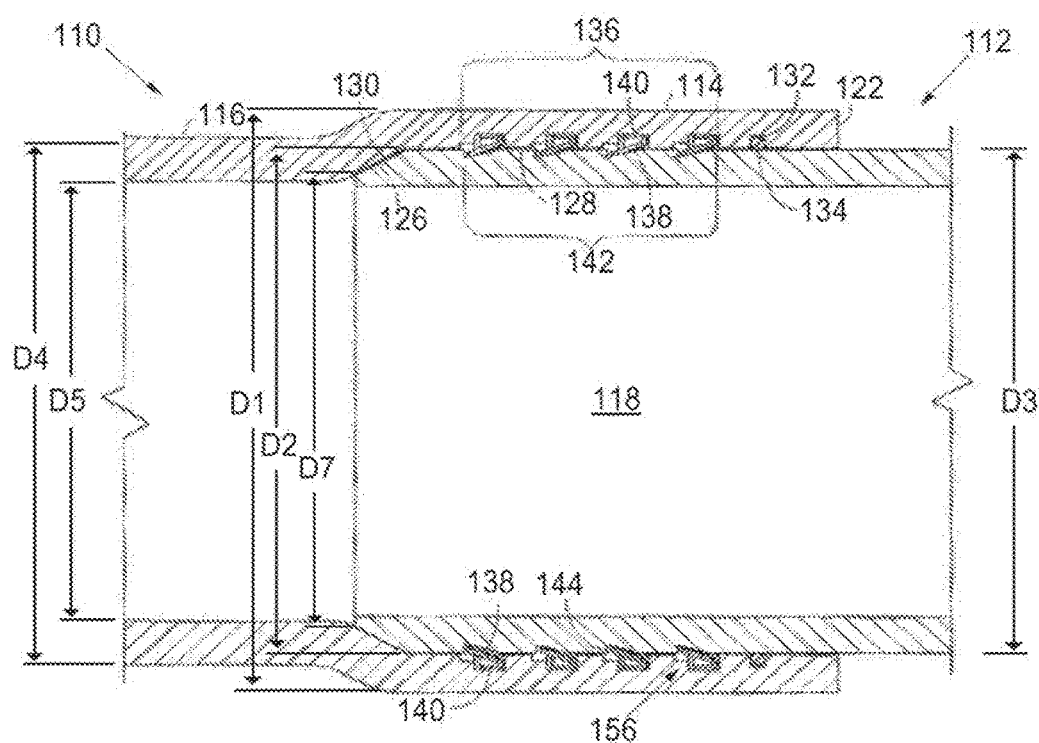
FIG. 4 is a cross sectional side view of the push-lock pipe connection system of FIG. 1 with the male end being fully inserted within the female end (also referred to as a male end receiving chamber) and a plurality of rigid fingers being positioned within their corresponding exterior circumferential grooves on the male end.

FIG. 4 shows the male end 118 of the similar adjacent pipe 112 fully inserted into the male end receiving chamber 124 on the female end 114 of the pipe 110. When fully inserted, the male leading edge 126 abuts the stop member 130. With the male end 118 fully inserted into the female end 114 the sets of rigid fingers 138 are positioned over their corresponding exterior circumferential grooves 142 on the male end 118, allowing each set of rigid fingers 138 to spring back toward its non-displaced position such that the rigid fingers 138 are received within the corresponding exterior circumferential grooves 142 on the exterior surface 128 of the male end 118. Preferably, a set of the rigid fingers 138 becomes positioned within each exterior circumferential groove such that a distal end 148 (see FIGS. 7A, 7B, & 7C) of each of the rigid fingers 138 abuts the sidewall 144 of the exterior circumferential grooves 142. The abutment of the distal ends 148 of the rigid fingers 138 against the sidewall 144 prevents movement of the male end 118 of the similar adjacent pipe 112 out of the male end receiving chamber 124 of the female end 114 of the pipe 110, thereby locking the pipe 110 and the similar adjacent pipe 112 together.

FIGS. 7A and 7B show a portion of a set of rigid fingers 138 extending from the band 140. As noted, in the preferred embodiment the band 140 is seated between the second sidewall 150 of the interior circumferential grooves 136 and the side surface 160 of the shoulder 156. FIG. 7C shows a side view of a set of rigid fingers 138 along section line 7C-7C (see FIG. 7B) and effectively illustrates the side profile of a single finger extending from the band 140. The finger extends from the band 140 through a bend 162. The bend 162 causes the rigid fingers 138 to extend out of the interior circumferential grooves 136 and into the male end receiving chamber 124 at the acute angle α away from the female leading edge 122, as shown in FIG. 5.

The number, shape, and size of rigid fingers 138 in each set of rigid fingers 138 is a design choice that depends on the application of the invention. With a 4.5 inch PVC pipe, a preferred embodiment has 135 stainless steel fingers in each set, with one set per interior circumferential groove. Each of the rigid fingers 138 is 0.060 inches wide and the sets of rigid fingers 138 have a 0.060 inch gap between each finger. The band 140 is approximately 0.155 inches long from its bottom edge to the bend 162, and the rigid fingers 138 are approximately 0.209 inches long from the bend 162 to their distal ends 148.

Figure 6:
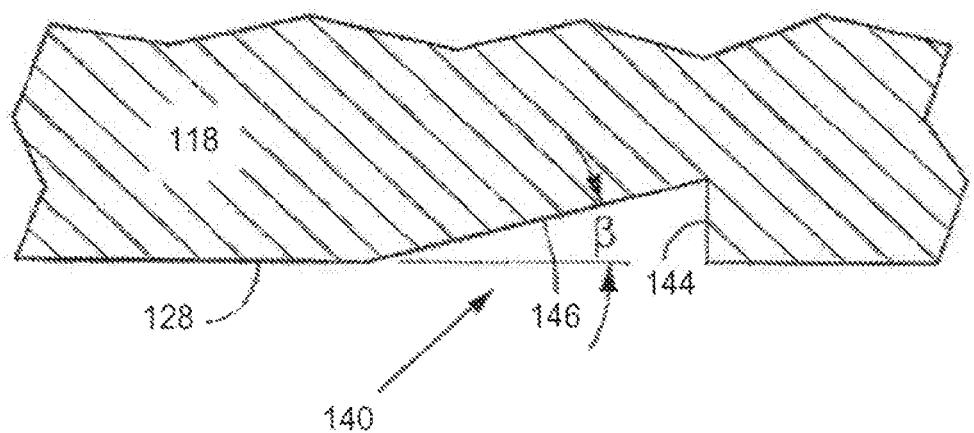
FIG. 6 is a cross sectional view showing a side profile of an exterior circumferential groove on the male end of one pipe.

As noted and shown in FIGS. 5 and 6, in the preferred embodiment the acute angle α created between the interior surface 120 of the female end 114 and the rigid fingers 138 is larger than the angle β between the bottom surface 146 of the exterior circumferential grooves 142 and the exterior surface 128 of the male end 118. As a result, the rigid fingers 138 bias against the bottom surface 146 of the exterior circumferential grooves 142 when fully received therein and will exert a continuous radially inward force on the bottom surface 146.

Figure 8:
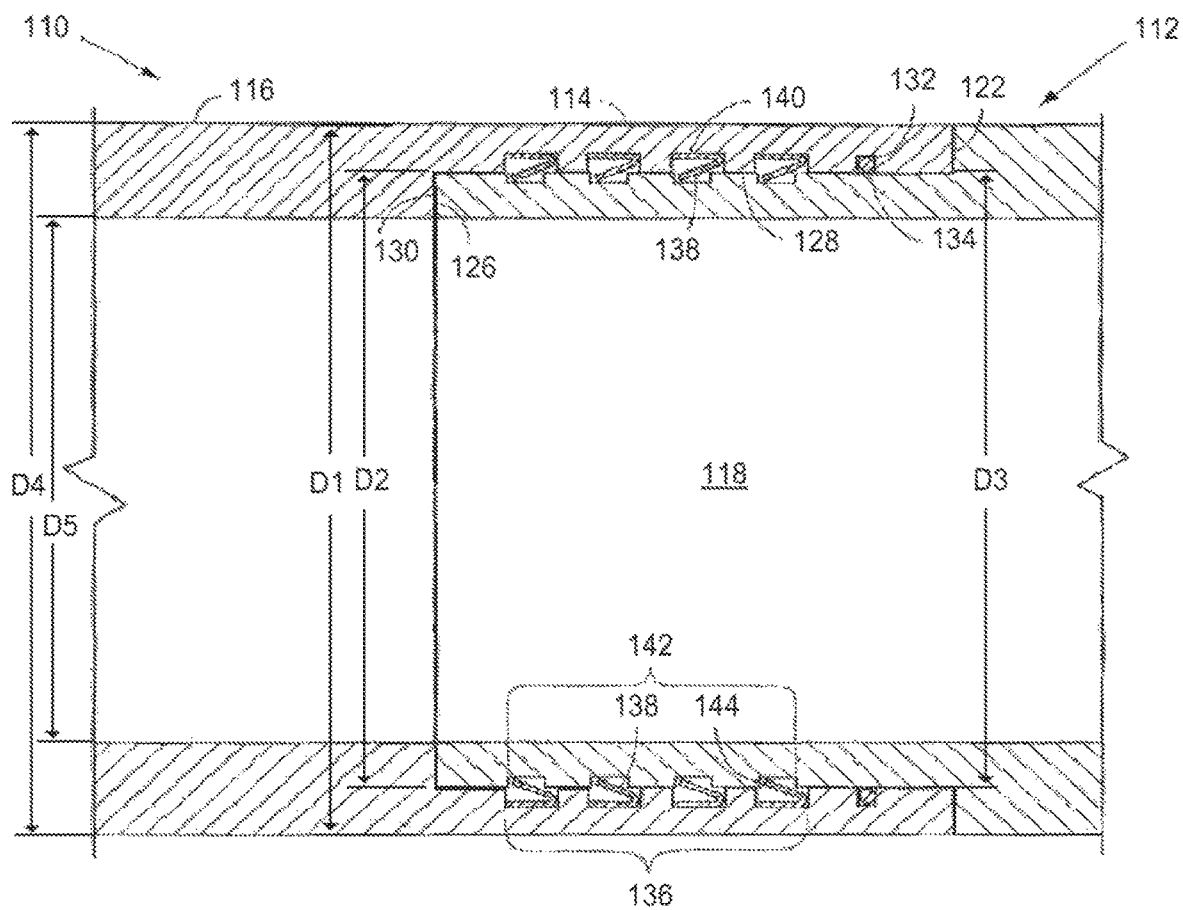
FIG. 8 is a cross sectional side view showing another embodiment of the push-lock pipe connection system of FIG. 1 with the male end being fully inserted within the female end (also referred to as a male end receiving chamber) and a plurality of rigid fingers being positioned within their corresponding exterior circumferential grooves on the male end.
Figure 9:
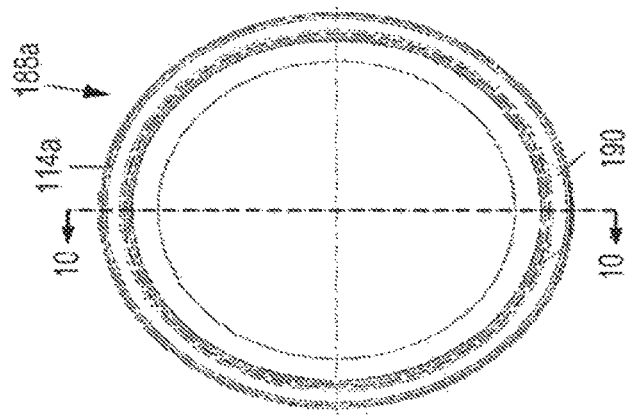
FIG. 9 is an end view of a female-by-female pipe coupling having a female end of the push-lock connection system of FIG. 1 at both ends of the pipe coupling, in accordance with embodiments disclosed herein.
Figure 10:
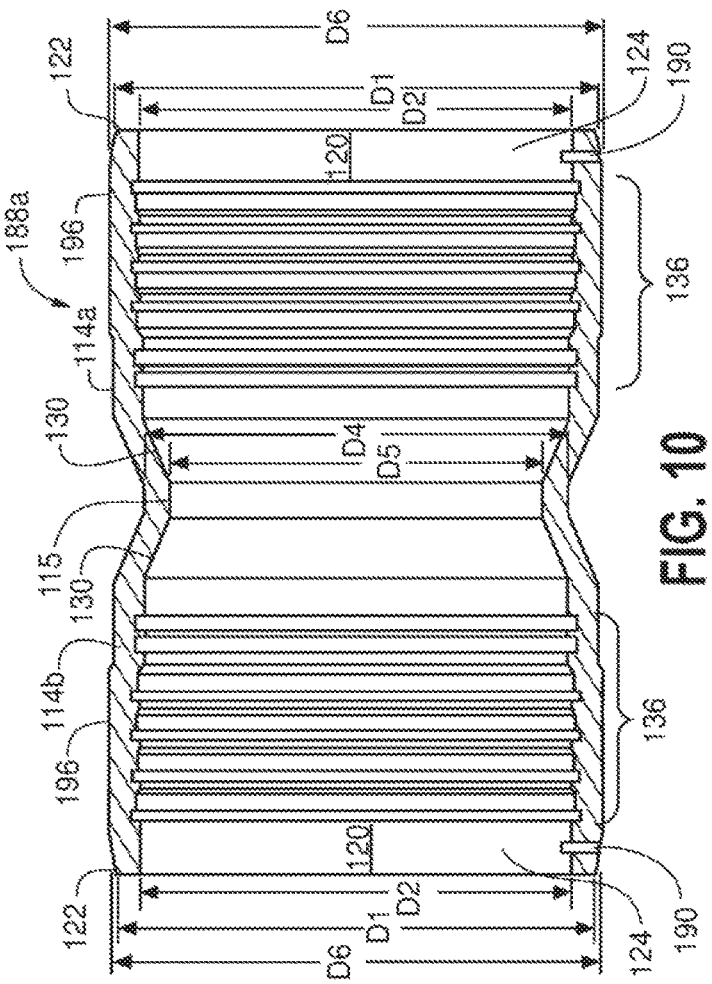
FIG. 10 is a cross sectional side view of the coupling of FIG. 9 taken along line 10-10 of FIG. 9.
Figure 11:
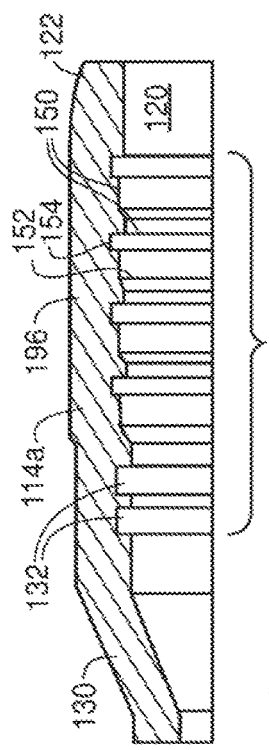
FIG. 11 is a detailed partial cutaway view of one end of the coupling of FIG. 9 showing interior circumferential grooves.

FIG. 8 shows an alternative embodiment having a different type of connection than the connection present in the previously described embodiment. The connection shown in FIG. 8 is referred to as a "Flush Mount" connection because the outer diameter of the female end 114 is substantially equal to the outer diameter of the intermediate length 116 between the male end 118 and the female end 114. In the Flush Mount connection, the male end receiving chamber 124 still has a diameter D2 that is greater than the interior diameter D5 of the intermediate length 116, but the male end receiving chamber 124 is formed by machining out the chamber and not by belling the female end 114 with a mandrel.

FIG. 8 also shows different embodiments that can be present regardless of whether a Flush Mount connection is used. For example, one aspect that differs from the previous embodiment is the interior circumferential grooves 142 do not have a shoulder 156. Consequently, each band 140 is wider and is seated between the sidewalls of each of the interior circumferential grooves 142. Another aspect that differs from the previous embodiment is that the male leading edge 126 is not beveled in FIG. 8. Finally, FIG. 8 shows the alternative embodiment where the bottom surface 146 of the exterior circumferential grooves 142 is not angled and the exterior circumferential grooves 142 have a substantially rectangular cross section profile.

Referring to FIGS. 9 through 47, embodiments disclosed herein include a pipe coupling generally designated as 188, but are discussed in specific embodiments designated as 188a-188i. A pipe coupling 188 is a fitting used to connect the ends of adjacent pipes together. Embodiments of the pipe coupling 188 can be arranged in a variety of configurations of a body and may be used to connect two female ends 114, two male ends 118, or a female end 114 to a male end 118. The pipe coupling 188 can also be used as an adapter to convert a male end 118 to a female end 114 or a female end 114 to a male end 118. In some embodiments, the pipe coupling 188 uses one or two portions, either a male end or a female end, to form a push-lock connection system with one or two adjacent pipes. This may result in the ends of the pipe coupling 188 securely interfacing with and engaging pipes 110, 112 as described herein to provide a seal and a restrained joint. In other embodiments, the pipe coupling 188 may also be configured to accept threaded ends or smooth/plain ends (configured for application of adhesive) as the female ends 114 or male ends 118 of pipes 110, and may be used to convert the connection type from a threaded 192 or smooth 194 end to an end configured with the push-lock coupling system as described herein. Connection types may include, for example, male push-lock connection, female push-lock connection, male threaded connection, female threaded connection, male smooth/plain end connection, and female smooth/plain end connection.

The pipe coupling may include a first end and a second end opposite from and integral with, of unitary construction with, and one seamless piece with the first end through a very short central portion (if existing at all), meaning that the material that the body of the coupling is made from, for example, PVC, and is continuous. Other materials may be selected as appropriate for the application.

Referring to FIGS. 9 through 13, a female-by-female embodiment of a pipe coupling 188a is shown. In this embodiment, the pipe coupling 188a has a first female end 114a of a body, a second female end 114b of the body, and a central portion 115 of the body therebetween at which location the two ends 114a, 114b meet. The central portion 115 of each embodiment is designated for reference and may not exist in reality, as it is in general merely the connection between the two ends. Each of the female ends 114a, 114b of the coupling 188a defines an outside diameter D1 and has an interior surface 120 that defines a male end receiving chamber 124 and an inside diameter D2. The female ends 114a, 114b terminate at a female leading edge 122, which may or may not be beveled. The female ends 114a, 114b in FIGS. 9-13 are each configured to receive a male end 118 of adjacent pipe 112 by means of the push-lock connection system as described herein. The male ends 118 may be inserted at least partially into the male end receiving chambers 124 of the pipe coupling 188. The central portion 115 between the two female ends 114a, 114b of the pipe coupling 188a may also define an interior diameter D5, which in this case is the smallest dimension of the coupling 188a. The pipe coupling 188 may further define an exterior diameter D1 of each female end 114a, 114b. The largest outside diameter D6 of each female end 114a, 114b may in some embodiments include a bulge 196, a taper, a protective ring or sleeve, or a similar outer shell feature, where D6 is greater than the exterior diameter D1 of the female ends 114a, 114b.

The male end receiving chamber 124 of the female ends 114a, 114b is configured to receive a male end 118 of an adjacent pipe 112 with the push-lock connection system of FIG. 1 with minimal clearance between the interior surface 120 of the female ends 114a, 114b when the adjacent pipe 112 (not shown) is connected. It should be noted that pipe couplings 188 disclosed herein are sized to correspond with the adjacent pipe 112 and have a tensile yield strength that is largely dependent on the material from which the pipe couplings 188 are made. In some embodiments, the couplings 188 may be made of PVC.

Referring again to FIGS. 9-13, a stop member 130 is disposed within each of the female ends 114a, 114b of the pipe coupling 188a preferably at the interior end 120 of the male end receiving chamber 124. In this regard, a diameter D2 of the male end receiving chamber 124 near the stop member 130 is larger than an interior diameter D5 of the central portion 116. As such, the stop member 130 may be a circumferential shoulder formed by the reduction in diameter D2 from the male end receiving chamber 124 to the interior diameter D5 of the central portion 115. Additionally, in the preferred embodiment, at least one and preferably two circumferential sealing grooves 132 (FIG. 11) are available to receive and seat an O-ring 134 (FIGS. 1-4) therein. These circumferential sealing grooves 132 are preferably disposed on the interior surface 120 of the female end 114 between interior circumferential grooves 136 (discussed infra) and the stop member 130. However, it is anticipated that in certain applications the circumferential sealing grooves 132 may be elsewhere on the interior surface 120 or may not be present, or alternatively may be located on the male end 118.

It should also be noted that the male end receiving chamber 124 as shown has at least two differing diameters, namely D2 and D4, along the length where the male end 118 of the pipe 112 is received. The first diameter D4 is near the stop member 130 as previously discussed. The second diameter D2 is along the interior surface 120 of the female ends 114a, 114b where interior circumferential grooves 136 (discussed infra) are disposed. Typically, diameter D4 is slightly smaller than diameter D2. The differing diameters allow an increased depth of the preferred circumferential sealing grooves 132 so the O-ring 134 can be seated deeper therein. In this regard, the diameter D2 is sized to accommodate an insertion member of a removal tool (not shown) as described in U.S. patent application Ser. No. 12/891,544 and narrowing D4 as compared to D2 allows the insertion member to insert into D2 while providing for a deeper depth for the circumferential sealing grooves 132 at D4. The reduced diameter D4 also assists in proper alignment of the male end 118 of the pipe 112 being connected.

FIGS. 9, 10, 12, and 13 also show that this embodiment of a coupling 188a includes sight windows 190 between the leading edge 122 of the female ends 114a, 114b and the first of the interior circumferential grooves 136. A sight window 190 is an opening that extends fully through the wall of the female end 114 of the coupling 188a. In operation, a male end 118 of an adjacent pipe 112 having the push-lock connection system described herein may have a portion colored or marked with a line or otherwise, and may also be designated with a groove, so that the color or other marking appears in the sight window 190 to signal a full insertion into one or more of the female ends 114a, 114b of the pipe coupling 188a. In one embodiment the sight window 190 may be approximately 1.50 inches in width at the opening on the outside surface of the coupling 188a, approximately 0.188 inches in length along the female end 114a, 114b, and may be cut or similarly machined using an approximately 2.25 inch diameter sight window cutting wheel 191. In one embodiment the sight window 190 may be offset from the female leading edge 122 by approximately 0.41 inches.

In one embodiment, the pipe coupling 188a may be a 6-inch nominal size for use as a mining well casing. In some such embodiments, the pipe coupling 188a may be approximately 14 inches in length (e.g., from the first end to the second end). Each end may be, for example, approximately 6.68 inches in length, while the central portion 116 may be approximately 0.64 inches in length. The exterior diameter D4 of the central portion 116 may be approximately 6.6 inches. In some embodiments, the exterior diameter D1 of the female end 114 is approximately 7.6 inches, while the exterior diameter D6 of the female end 114 including the bulge 96 is approximately 7.7 inches.

As mentioned, the interior surfaces 120 of the female ends 114a, 114b each have a plurality of interior circumferential grooves 136 disposed on them. In the preferred embodiment, the number of interior circumferential grooves 136 is four. However, it is anticipated that this number could be more or less than four and even as few as one, depending upon the application.

The interior circumferential grooves 136 may be cut or similarly machined into the interior surface 120 of the male end receiving chamber 124 at various depths. The inside surface 120 of the male end receiving chamber 124 may include sloped or angled sections at various angles including approximately 130 degrees from horizontal as the inside surface 120 slopes from diameter D2 toward the stop member 130 at diameter D5.

Figure 14:
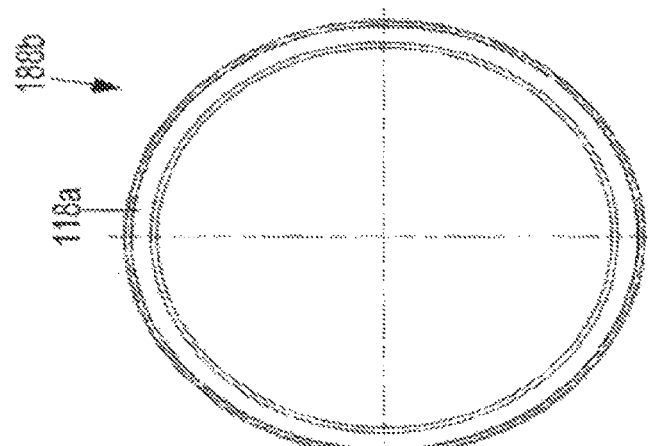
FIG. 14 is an end view of a male-by-male pipe coupling having a male end of the push-lock connection system of FIG. 1 at both ends of the pipe coupling, in accordance with embodiments disclosed herein.
Figure 15:
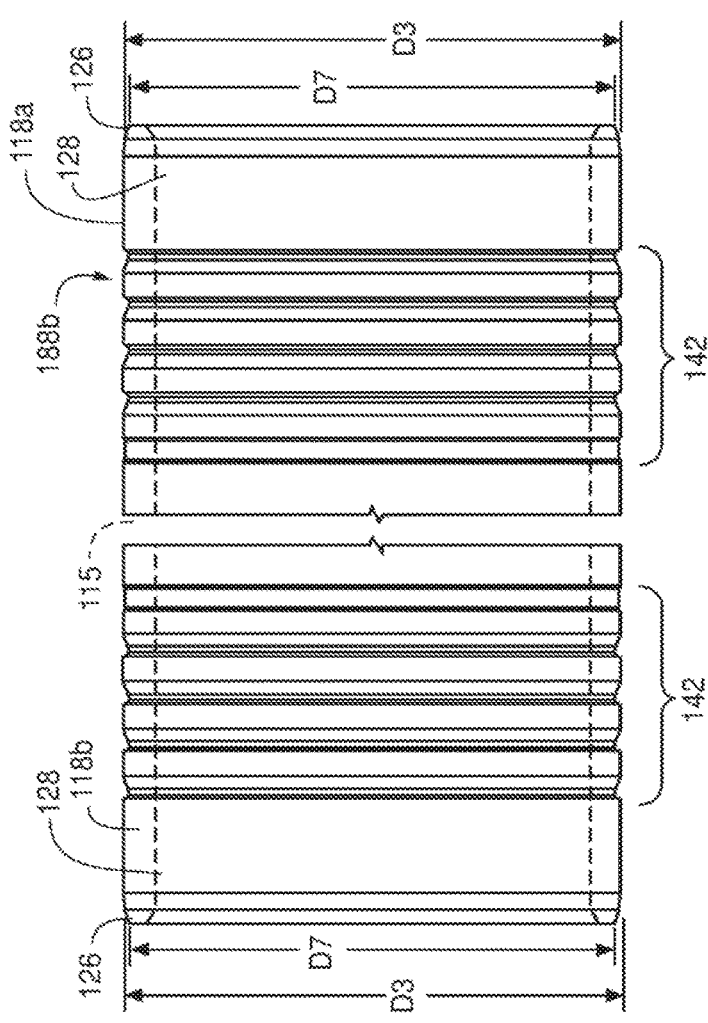
FIG. 15 is a side view of the coupling of FIG. 14.
Figure 16:
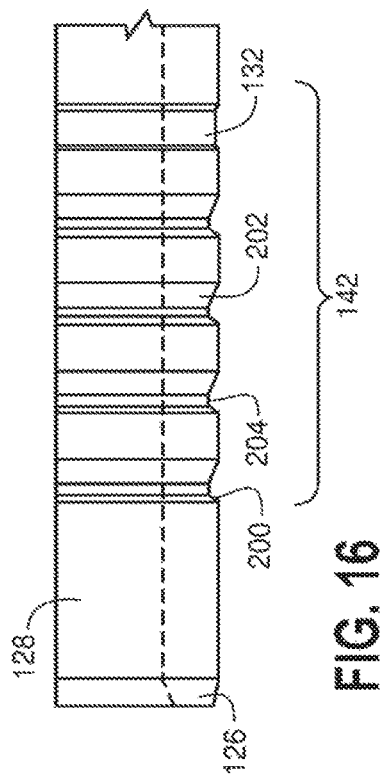
FIG. 16 is a detailed view of a portion of one end of the coupling of FIG. 14.

FIGS. 14-16 show a male-by-male embodiment of the pipe coupling 188b. In this embodiment, the pipe coupling 188b has a first male end 118a, a second male end 118b, and central portion 115 between (which has been removed from FIG. 15, however, for illustration purposes). Each of the male ends 118a, 118b terminates in a male leading edge 126 which may or may not include a bevel and has an exterior surface 128 with a circumference and diameter D3 that is smaller than diameter D2 of the male end receiving chamber 124 on the female ends 114a, 114b.

The male end 118 (118a, 118b) may vary in length according to its application. Typically, the exterior diameter D3 defined by the exterior surface 128 of the male end 118 is approximately 6.625 inches, which is smaller than the approximate interior diameter D2 of the male end receiving chamber 124. The male end 118 may be beveled as shown in FIG. 13 to a diameter D7 and at an approximate angle of 10 degrees and length of approximately 0.5 inches so that the beveled male end 118 securely fits against the stop member 130 and corresponds to the interior diameter D5 of the central portion 115 of the male end receiving chamber 124.

Disposed on the exterior surface 128 of the male end 118 is a plurality of exterior circumferential grooves 142. In some embodiments, each of the exterior circumferential grooves 142 may have a generally trapezoidal cross-section with a first sidewall 200, an opposite sidewall 202, and a bottom surface 204. Although preferably trapezoidal, it is anticipated that the exterior circumferential grooves 142 could have a variety of cross-sections.

The exterior circumferential grooves 142 on the male end 118 may be offset along the length of the male end 118 from the bevel by approximately 2 inches. The exterior circumferential grooves 142 may be spaced apart from one another along the length of the male end 118. The exterior circumferential grooves 142 on the male end 118 may be cut into the male end 118 at an approximate depth of 0.075 inches. The bottom surface 204 of the exterior circumferential grooves 142 on the male end 118 may have an approximate width of 0.1 inches. The side wall 200 of the male end 118 may be angled or sloped at an approximate angle of 60 degrees from horizontal, while the opposite side wall 202 may be at an angle of 20 degrees from horizontal.

Reference is sometimes made herein to the male ends 118a, 118b of the pipe coupling 188 being inserted into female ends 114a, 114b. When such reference is made, it is merely provided for explanation purposes. While the male ends 118a, 118b of the pipe coupling 88 are intended to be inserted into the female end of an adjacent pipe with the push-lock connection system described herein (not shown), the male ends 118a, 118b could be inserted into the female ends 114a, 114b of a separate pipe coupling 188, though doing so may not be practical. Similarly, the female ends 114a, 114b are intended to receive a male end 118 of an adjacent pipe 112 with the push-lock connection system described herein, though for explanation purposes herein reference is made to the male ends 118a, 118b. Again, such a connection could be made between a pipe coupling 188 having one of more of the male ends 118a, 118b and a separate pipe coupling 188 having one or more female ends 114a, 114b, though doing so may not be practical.

As shown in FIG. 5, in the preferred embodiment of the female ends 114a, 114b, the interior circumferential grooves 136 have a generally rectangular cross section profile with a first side wall 150, a second sidewall 152, a bottom surface 154, and a shoulder 156 positioned adjacent the first side wall 150. The shoulder 156 has a top surface 158 and a side surface 160. In this embodiment, the band 140 is seated between the second sidewall 152 of the interior circumferential grooves 136 and the side surface 160 of the shoulder 156 such that the rigid fingers 138 extend above and over the shoulder 156. It should also be noted that the sidewall 150 of the interior circumferential grooves 136 may be sloped as shown in FIG. 16, giving the interior circumferential groove 136 a trapezoidal profile. When one of the male ends 118a, 118b is inserted into one of the female ends 114a, 114b, the minimal clearance there between will cause each set of rigid fingers 138 to be displaced at least partially, if not totally, into the interior circumferential grooves 136. In this regard, the distal end 148 of each of the rigid fingers 138 (see FIG. 5) displaces into the space between the top surface 158 of the shoulder 156 and the top edge of the first sidewall 150 of the interior circumferential grooves 136.

As shown in FIG. 15, the male leading edge 126 of the male ends 118a, 118b is preferably beveled. The angling, bending, or biasing of the rigid fingers 138 away from the female leading edge 122 allows the male ends 118a, 118b to be inserted into the male end receiving chamber 124, and, the insertion is facilitated by the bevel at the male leading edge 126 as well as the triangular cross section profile of the exterior circumferential grooves 142. As the male ends 118a or 118b are inserted, the exterior surface 128 of the male ends 118a, 118b contacts the sets of rigid fingers 138 and causes the rigid fingers 138 to be displaced toward the interior surface 120 of the female end 114.

Once one of the male ends 118a, 118b is fully inserted into the male end receiving chamber 124 of the female end 114, the male leading edge 126 abuts the stop member 130. Upon full insertion of the male ends 118a, 118b, the female ends 114a, 114b the sets of rigid fingers 138 are positioned over their corresponding exterior circumferential grooves 142 on the male ends 118a, 118b, allowing each set of rigid fingers 138 to spring back toward its non-displaced position such that the rigid fingers 138 are received within the corresponding exterior circumferential grooves 142 on the exterior surface 128 of the male ends 118a, 118b. Preferably, a set of the rigid fingers 138 becomes positioned within each exterior circumferential groove such that the distal end 148 of each of the rigid fingers 138 abuts the sidewall 200 of the exterior circumferential grooves 142. The abutment of the distal ends 148 of the rigid fingers 138 against the sidewall 200 prevents movement of the male ends 118a, 118b out of the male end receiving chamber 124 of the female ends 114a, 114b, thereby locking together the pipe coupling 188b and the adjacent pipe 112 with the push-lock connection system described herein.

As noted and shown in the embodiment of FIGS. 5 and 6, the acute angle α created between the interior surface 120 of the female ends 114a, 114b and the rigid fingers 138 may be larger than the angle between the bottom surface 146 of the exterior circumferential grooves 142 and the exterior surface 128 of the male ends 118a, 118b. As a result, the rigid fingers 138 bias against the bottom surface 146 of the exterior circumferential grooves 142 when fully received therein and will exert a continuous radially inward force on the bottom surface 146.

A plurality of sets of rigid fingers 138 extend from each of the interior circumferential grooves 136 and into the male end receiving chamber 124 of the female ends 114a, 114b. A set of these rigid fingers 138 and the fingers 138 themselves are shown in FIGS. 17-22. The rigid fingers 138 extend from the band 140 as described in the push-lock connection system described herein and shown in the enclosed FIGS. 5 and 6. In this regard, as shown in FIG. 5, an acute angle α is formed between each of the rigid fingers 138 and the interior surface 120 of the female end 114 and directed away from the female leading edge 122. In one embodiment, the angle α formed between each of the rigid fingers 138 and the interior surface 120 may measure between 27 degrees and 30 degrees inclusive.

In some embodiments, each of the rigid fingers 138, as well as the band 140, may be approximately 0.030 inches thick. The band 140 may be approximately 0.04 inches tall, with extruded portions that connect the individual rigid fingers 138 to the band 140 along a bend line 182 being 0.09 inches tall. The height of each rigid finger 138 before bending is approximately 0.3 inches. The height of the band 140 in addition to the rigid fingers 138 is approximately 0.44 inches. The rigid fingers 138 may be spaced apart from one another by approximately 0.06 inches and approximately 0.24 inches to center. Each rigid finger 138 is approximately 0.18 inches wide. Teeth may be, for example, for PVC pipe couplings of nominal size 4-inch, 64 teeth, and 6-inch, 92 teeth. More than 20, 40, 60, or 80 teeth may be provided.

Although rigid, each of the rigid fingers 138 is displaceable and can be radially displaced toward and away from the interior surface 120 of the female end 114. Further, each of the rigid fingers 138 may be biased toward a non-displaced position (as shown in FIG. 22) at an approximate angle of 40 degrees in the male end receiving chamber 124 unless acted upon by some force. Preferably, the rigid fingers 138 are made of stainless steel. However, any number of substantially rigid materials could be used, depending on the application and the tensile forces involved. In the preferred embodiment, each set of rigid fingers 138 extends from a band 140 (see FIGS. 17, 19, and 21) that is seated within each of the interior circumferential grooves 136.

As shown in FIGS. 17-19, the band 140 may have one or more fingers 138 removed from its ends. Doing so allows for the ends of the band 140 to be attached as shown in FIG. 20. Attaching the ends of the band 140 may be accomplished by overlapping its ends and applying a spot weld as shown in FIG. 21. In some embodiments, the two ends of the band 140 overlap approximately 0.3 inches.

FIGS. 23-25 disclose an adapter embodiment of a pipe coupling 188c to convert an existing pipe system 110 having a threaded 192 male end 118 (not shown) into one having the female end 114a of the push-lock connection system described herein. In this regard, the pipe coupling 188c has a threaded 192 female end 114b configured to receive the threaded 192 male end 118 at one end and a female end 114a of the push-lock connection system described herein at the other end. The threaded 192 female end 114b may be coupled to the threaded 192 male end 118 of the adjacent pipe 110 (not shown) by threading the threaded 192 female end 114b on the threaded 192 male end 118. Conversely, the female end 114a of the push-lock connection system described herein of the pipe coupling 188 may be coupled as disclosed above to a male end 118 of the push-lock connection system described herein.

External male threads 192 are preferably NPT (American National Standard Taper Pipe Threads) threads 192 and are intended to be threaded into internal female threads 192 to provide a watertight connection. Internal female end threads 192 are also preferably NPT threads 192. NPT threads 192 are typically triangular with flat crests and roots. However, it is anticipated that triangular threads 192, square threads 192, or other thread profiles might also be utilized.

FIGS. 26-28 disclose an adapter embodiment of the pipe coupling 188d to convert an existing pipe system 110 having a male end 118 (not shown) that is smooth/plain and configured for receiving adhesive into one having the female end 114a of the push-lock connection system described herein. In this regard, the pipe coupling 188d has a female end 114b configured to receive a plain male end 118 at one end and a female end 114a of the push-lock connection system described herein at the other end. The male end 114b may be coupled to the male end 118 of the existing pipe 110 (not shown) via gluing (or another adhesive) or welding the exterior surface 128 of the smooth 194 male end 118 to the interior surface 120 of the smooth 194 female end 114b. Conversely, the female end 114a of the push-lock connection system described herein of the pipe coupling 188 may be coupled as disclosed above to a male end 118 of the push-lock connection system described herein.

Figure 29:
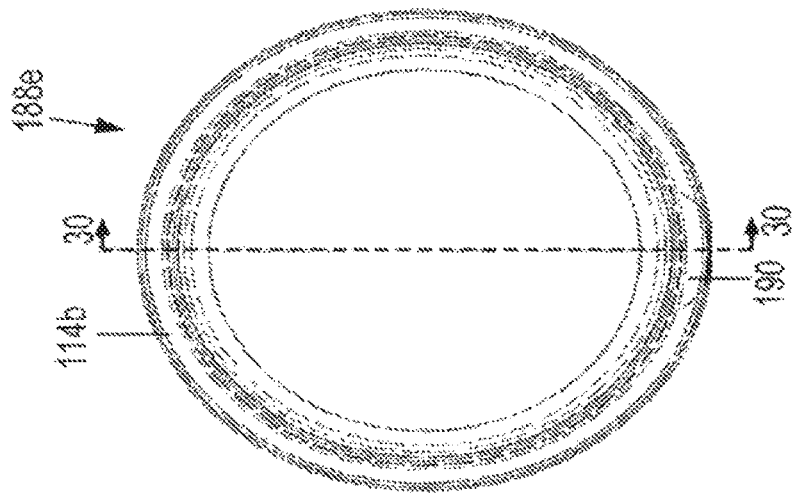
FIG. 29 is an end view of a pipe coupling having a male end with the push-lock connection system of FIG. 1 at one end and a threaded female end at a second end of the pipe coupling, in accordance with embodiments disclosed herein.
Figure 30:
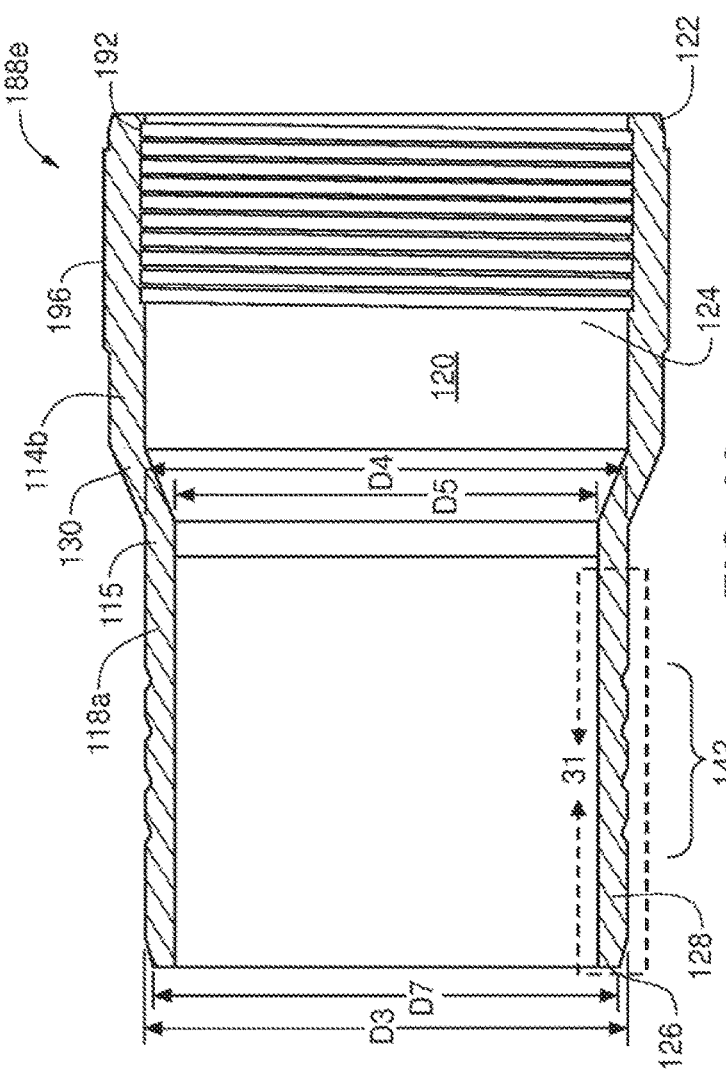
FIG. 30 is a cross sectional side view of the coupling of FIG. 29 taken along line 30-30 of FIG. 29.
Figure 31:
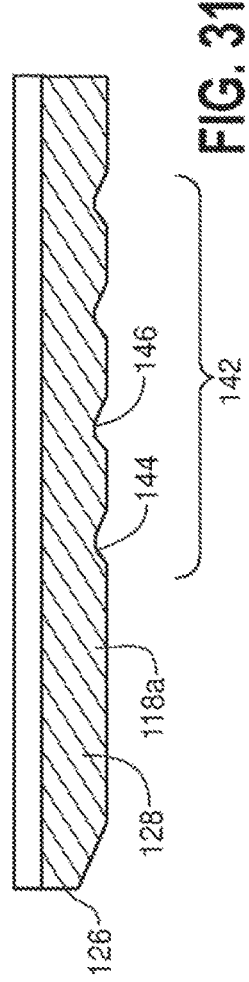
FIG. 31 is detailed partial cutaway view of one end of the coupling of FIG. 23 showing exterior circumferential grooves.

FIGS. 29-31 disclose an adapter embodiment of the pipe coupling 188e to convert an existing pipe system 110 having a threaded 192 male end 114 (not shown) to having a male end 118a of the push-lock connection system described herein. In this regard, the pipe coupling 188 has a threaded 192 female end 114b configured to receive the threaded 192 male end 118 at one end and a male end 118a of the push-lock connection system described herein at the other end. The threaded 192 male end 118 of the existing pipe 110 (not shown) may be threaded into the threaded 192 female end 114b of the pipe coupling 188. Conversely, the male end 118a of the push-lock connection system described herein of the pipe coupling 188 may be coupled as disclosed above to a female end 114 of the push-lock connection system described herein.

FIGS. 32-34 disclose an adapter embodiment of the pipe coupling 188f to convert an existing pipe system 110 having a male end 118 (not shown) into a male end 118 having the push-lock connection system described herein. In this regard, the pipe coupling 188 has a smooth female end 114a at one end and a male end 118b of the push-lock connection system described herein at the other end. The exterior surface 128 of the smooth male end 118 of the existing pipe 110 (not shown) may be coupled to the interior surface 120 of the smooth female end 114a of the pipe coupling 188f. Conversely, the male end 118b of the push-lock connection system described herein of the pipe coupling 188f may be coupled as disclosed above to a female end 114 of the push-lock connection system described herein.

FIGS. 35-38 disclose a pipe coupling 188g to extend an existing pipe system 110 having one type of end of the push-lock connection system described herein (i.e., a male 118 or female end 114). In this regard, the pipe coupling 188g has a female end 114a of the push-lock connection system described herein at one end and a male end 118b of the push-lock connection system described herein at the other end. The female end 114a of the push-lock connection system described herein of the pipe coupling 188g may be coupled as disclosed above to a male end of the push-lock connection system described herein. Conversely, the male end 118b of the push-lock connection system described herein of the pipe coupling 188 may be coupled as disclosed above to a female end 114 of the push-lock connection system described herein of the adjacent pipes 110, 112.

Figure 39:
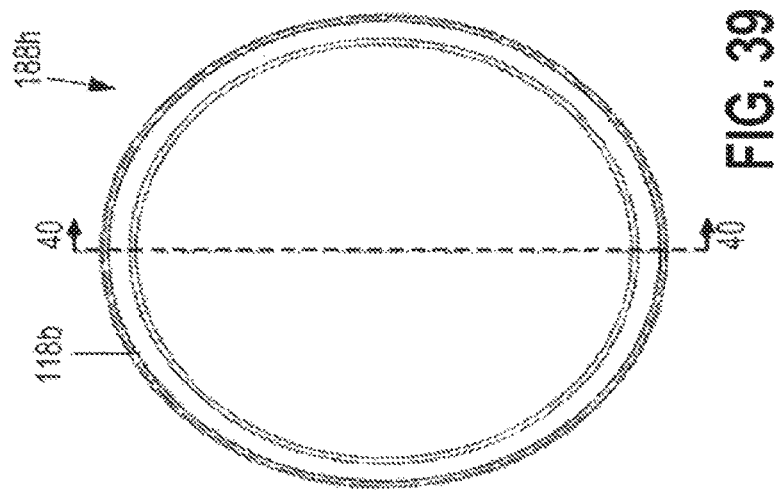
FIG. 39 is an end view of a pipe coupling having a male end with a push-lock connection system similar to that of FIG. 1 at one end and a plain, unthreaded male end configured to receive an adhesive at a second end of the pipe coupling, in accordance with embodiments disclosed herein.
Figure 40:
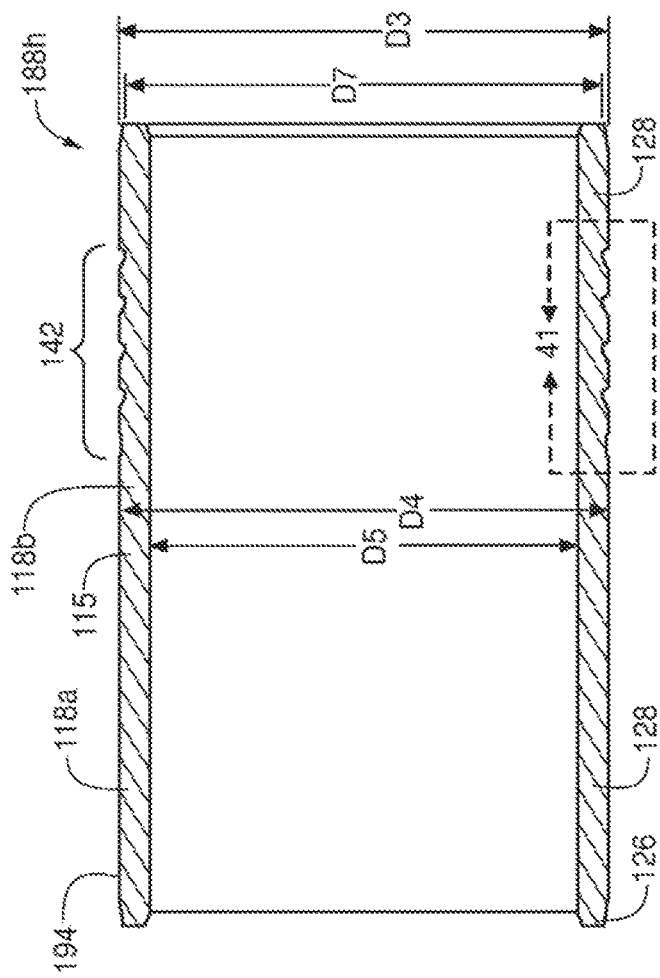
FIG. 40 is a cross sectional side view of the coupling of FIG. 39 taken along line 40-40 of FIG. 39.
Figure 41:
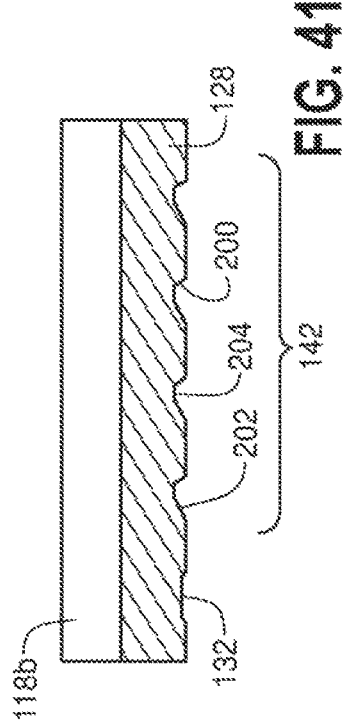
FIG. 41 is a detailed partial cutaway view of the coupling of FIG. 39 showing exterior circumferential grooves in the male end of the coupling with the push-lock connection system.

FIGS. 39-41 disclose a pipe coupling 188h to convert an existing pipe system 110 having a smooth female end 114 (not shown) to a male end 118 having the push-lock connection system described herein. In this regard, the pipe coupling 188h has a male end 118a that is smooth 194 at one end and a male end 118b having the push-lock connection system described herein at the other end. The interior surface 120 of the smooth 194 female end 114 of the adjacent pipe 110 (not shown) may be coupled to the exterior surface 128 of the male end 118a of the pipe coupling 188h. Conversely, the male end 118b of the push-lock connection system described herein of the pipe coupling 188 may be coupled as disclosed above to a female end 114 of the push-lock connection system described herein.

Figure 42:
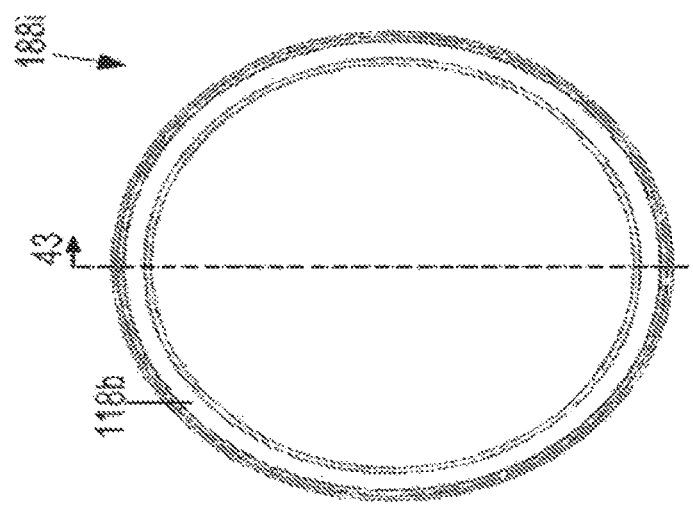
FIG. 42 is an end view of a pipe coupling having a male end with the push-lock connection system similar to that of FIG. 1 at one end and a threaded male end at a second end of the pipe coupling, in accordance with embodiments disclosed herein.
Figure 43:
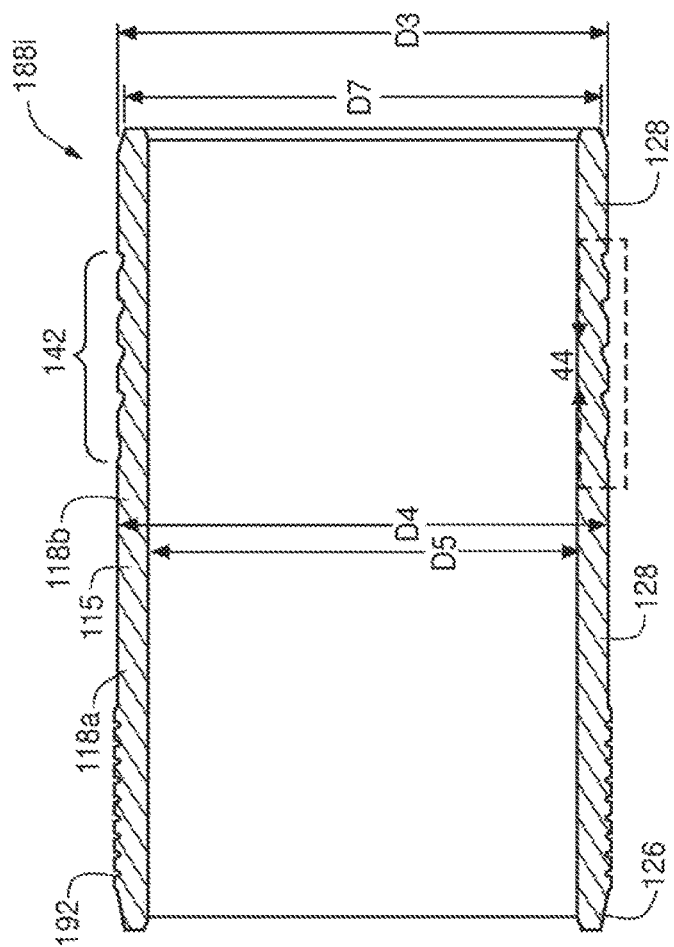
FIG. 43 is a cross sectional side view of the coupling of FIG. 42 taken along line 43-43 of FIG. 42.
Figure 44:
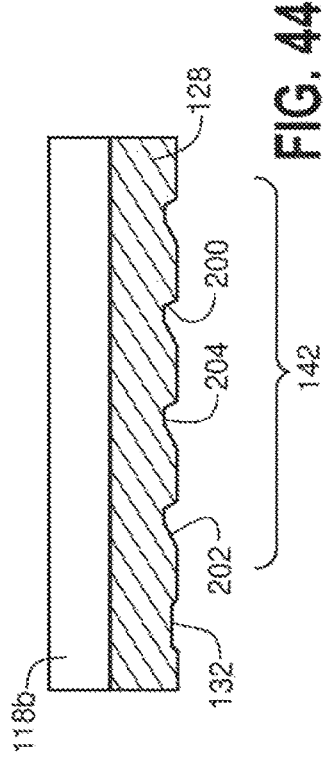
FIG. 44 is a detailed partial cutaway view of the coupling of FIG. 42 showing exterior circumferential grooves in the male end of the coupling with the push-lock connection system.

FIGS. 42-44 disclose a pipe coupling 188i to convert an existing pipe system 110 having a threaded 192 female end 114 (not shown) to a male end 118 having the push-lock connection system described herein. In this regard, the pipe coupling 188 has a threaded 192 male end 118a of the push-lock connection system described herein at one end and a male end 118b having the push-lock connection system described herein at the other end. The threaded 192 female end 114 of the existing pipe 110 (not shown) may be threaded onto the threaded 192 male end 118a of the pipe coupling 188. Conversely, the male end 118b of the push-lock connection system described herein of the pipe coupling 188i may be coupled as disclosed above to a female end 114 of the push-lock connection system described herein of the existing pipe system 110 or a similar adjacent pipe 112.

FIGS. 45-47 disclose a pipe coupling 188a as shown in FIGS. 9-13 to convert a pipe having a threaded male end 118 (not shown) to a female end 114b of the push-lock connection system described herein. In this regard, the pipe coupling 188*a* has a threaded 192 female end 114*a* at one end and a female end 114*b* having the push-lock connection system described herein at the other end. The threaded 192 male end 118 of an adjacent pipe (not shown) may be threaded into the threaded 192 female end 114*a* of the pipe coupling 188*a*. Conversely, the female end 114*b* of the push-lock connection system described herein having the pipe coupling 188*a* may be coupled as disclosed above to a male end 118 of the push-lock connection system described herein of an adjacent pipe. As depicted in FIGS. 46 and 47 the band 140 of rigid fingers 138 may be installed in the grooves 136 in the interior surface 120 of the female end 114*b*.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein. While the foregoing is directed to embodiments of a pipe coupling, other and further embodiments may be devised without departing from the basic scope thereof, and the scope thereof is determined by the claims that follow.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method of coupling adjacent pipes, comprising:
providing a first connection on a first pipe or a first pipe coupling, the first connection having a female end with an interior surface, a thickness, and a female leading edge terminating the female end of the first connection, the interior surface of the female end defining a receiving chamber, wherein the female end defines a sight window comprising an opening extending through the thickness of the female end and configured to permit viewing within the receiving chamber;
providing a second connection on a second pipe or a second pipe coupling, the second connection having a male end having a male leading edge and an exterior surface, the exterior surface having a circumference smaller in diameter than an inside diameter of the receiving chamber of the female end, wherein at least one exterior circumferential groove is defined on the exterior surface of the male end, wherein the male end exterior surface includes an indication that when viewed through the sight window indicates that the male end has been fully inserted into the female end;
providing a band having a plurality of rigid fingers, each rigid finger individually comprising a bend and a distal end, the plurality of rigid fingers each formed continuously with and extending from the band with each rigid finger having a finger length defined between the distal end and the bend; and
seating the band within a groove cross-section of the at least one circumferential groove, wherein the finger length exceeds a bottom surface length of the at least one circumferential groove.

2. The method of claim 1, wherein the groove cross-section is defined by a first sidewall, a second sidewall, a bottom surface and a shoulder wall positioned between the first sidewall and the second sidewall and wherein the bottom surface length is defined between the second sidewall and the shoulder wall.

3. The method of claim 2, further comprising:
inserting the male leading edge past the female leading edge such that the male end is introduced into the receiving chamber and the plurality of rigid fingers extend into the receiving chamber at an acute angle directed away from the female leading edge.

4. The method of claim 1, wherein the first pipe defines a longitudinal axis, and wherein the sight window is elongated in a direction perpendicular to the longitudinal axis.

5. The method of claim 1, wherein the indication on the exterior surface of the male end comprises a coating differing in appearance from the exterior surface.

6. A method of coupling adjacent pipes, comprising:
providing a first pipe having a first connection, the first connection including a female end with an interior surface, a thickness, and a female leading edge terminating the female end, the interior surface of the female end defining a receiving chamber and wherein the female end defines a sight window comprising an opening extending through the thickness of the female end;

providing a second pipe having a second connection, the second connection including a male end having a male leading edge and an exterior surface, the exterior surface having a circumference smaller in diameter than an inside diameter of the receiving chamber of the female end, wherein at least one exterior circumferential groove is defined on the exterior surface of the male end, the at least one exterior circumferential groove having a groove cross-section defined by a first sidewall, a second sidewall, a bottom surface and a shoulder wall positioned between the first sidewall and the second sidewall;

seating a band within the at least one exterior circumferential groove, the band including a plurality of rigid fingers, each rigid finger individually comprising a bend and a distal end, the plurality of rigid fingers each formed continuously with and extending from the band with each rigid finger having a finger length defined between the distal end and the bend, the finger length exceeding a bottom surface length of the at least one circumferential groove as defined between the second sidewall and the shoulder wall; and inserting the male leading edge past the female leading edge such that the male end is introduced into the receiving chamber and the plurality of rigid fingers extend into the receiving chamber at an acute angle directed away from the female leading edge, the plurality of rigid fingers being displaceable and wherein each rigid finger has a finger length that exceeds a bottom surface length of the at least one circumferential groove as defined between the second sidewall and the shoulder wall.

* * * * *